(12) United States Patent
Adler et al.

(10) Patent No.: US 6,342,901 B1
(45) Date of Patent: Jan. 29, 2002

(54) INTERACTIVE DEVICE FOR DISPLAYING INFORMATION FROM MULTIPLE SOURCES

(75) Inventors: Annette M. Adler, Palo Alto; Kenneth P. Fishkin, Redwood City; Matthew E. Howard, San Francisco, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/218,751

(22) Filed: Dec. 22, 1998

(51) Int. Cl.[7] ................................................. G06F 3/14
(52) U.S. Cl. ..................... 345/700; 345/763; 345/769; 345/733; 709/201; 709/217; 713/300; 713/340
(58) Field of Search ............................... 345/349, 333, 345/329, 339, 156, 173, 211, 526, 502, 326, 978; 709/201, 217; 713/300, 340

(56) References Cited

U.S. PATENT DOCUMENTS

| | | | |
|---|---|---|---|
| 4,247,908 A | * | 1/1981 | Lockhart, Jr. et al. |
| 4,435,764 A | * | 3/1984 | El-Gohary .................. 709/253 |
| 5,283,818 A | | 2/1994 | Klausner et al. ............... 379/67 |
| 5,528,290 A | | 6/1996 | Saund ......................... 348/218 |
| 5,581,637 A | | 12/1996 | Cass et al. ................... 382/284 |
| 5,659,639 A | | 8/1997 | Mahoney et al. ............ 382/309 |
| 5,692,073 A | | 11/1997 | Cass ........................... 382/219 |
| 5,740,366 A | * | 4/1998 | Mahany et al. .............. 709/227 |
| 5,805,807 A | * | 9/1998 | Hanson et al. ............... 370/340 |
| 5,809,267 A | * | 9/1998 | Moran et al. ................. 345/358 |
| 5,835,732 A | * | 11/1998 | Kikinis et al. ............... 710/101 |
| 5,900,564 A | * | 5/1999 | Kurakake .................. 84/477 R |

OTHER PUBLICATIONS

Essick, Kristi. "Defrost, Cook, Send E–Mail with this Internet–Enabled Microwave Oven," CNN Interactive, (website "http://cnn.com/TECH/computing/9809/14/microwave.idg/index.html") Sep. 13, 1998.

"Japanese Company Combines Computer and Refrigerator," CNN Interactive, (website "http://cnn.com/TECH/computing/9809/30/japan.internet.fridge/index.html") Sep. 30, 1998.

Michalski, Jerry. "The Fridge Door," Release 1.0, Nov. 21, 1997, pp. 1–15.

Pedersen, E.R. et al. "Tivoli: An Electronic Whiteboard for Informal Workgroup Meetings," Proceedings of the INTERCHI '93 Conference on Human Factors in Computing Systems, Apr. 24–29, 1993, Amsterdam, The Netherlands.

\* cited by examiner

Primary Examiner—Raymond J. Bayerl
Assistant Examiner—Thomas T. Nguyen
(74) Attorney, Agent, or Firm—C. A. Wixon; L. M. Robb

(57) ABSTRACT

A networked parasitic user interface terminal capable of deriving power from a host. The user terminal, adapted for use in a system for receiving, analyzing, and managing diverse information obtained from a variety of source documents, is structurally mounted to a host structure, such as an electrical appliance or a wall, and receives its power parasitically from its host. The user interface is connected to a digital network via a communications link and receives information to display from a remote processor. The user interface terminal does not receive any data directly from its host.

26 Claims, 27 Drawing Sheets

WALTER HAYS SCHOOL SCHEDULE - 1997-98 — 710

Regular Daily:
School Begins. . . . . . . . . . . 8:25 a.m. . . . . . . . . . . Grades K-5
A.M. Recess. . . . . . . . . . . . 10:00-10:20 a.m. . . . . . Grades 1-5
Lunch . . . . . . . . . . . . . . . . 11:45-12:40 p.m. . . . . . Grades 1-3
Lunch . . . . . . . . . . . . . . . . 12:00-12:40 p.m. . . . . . Grades 4-5
Dismissal . . . . . . . . . . . . . 11:50 a.m. . . . . . . . . . . Kindergarten
 . . . . . . . . . . . . . . . . . . . . 2:45 p.m. . . . . . . . . . . . Grades 1-5

Grades 1 - 5 Shortened Days (Dismissal 1:30p.m.) — 714
Every Wednesday Starting September 3, 1997
Dismissal for Grades 1 - 5 . . . . . . . . . . . . . . . . . . . 1:30p.m. — 716

ADDITIONAL SHORTENED DAYS: (Dismissal 1:30p.m.)
718 — Wednesday, November 26, 1997 . . . . . . . . . Day before Thanksgiving
Friday, December 19, 1997 . . . . . . . . . . . . Day before Winter Break
Wednesday, June 10, 1998 . . . . . . . . . . . . Day before Summer Vacation

Grades 1 - 5 Shortened Day Schedule
School Begins . . . . . . . . . . 8:25 a.m.
A.M. Recess . . . . . . . . . . . 10:00-10:20 a.m.
Lunch . . . . . . . . . . . . . . . . 11:50-12:30 p.m. . . . . . Grds. 1 - 3
Lunch . . . . . . . . . . . . . . . . 12:00-12:30 p.m. . . . . . Grds. 4 & 5
Dismissal . . . . . . . . . . . . . 1:30 p.m. — 720

*(handwritten annotation: Note New Times For Dismissal)*

FIG. 7

MiDor L'Dor Program Calendar
1997-98 school year

September
- 14 — KICK OFF PICNIC (12 noon-2 pm, with Shorashim, at Mitchell Park)
- 20 — MiDor L'Dor Begins

October
- 4 — Regular Session
- 18 — Regular Session
- 19 — BRUNCH (10am -12 noon, with Shorashim, Location to be announced)

November
- 1 — Regular Session
- 15 — Regular Session

December
- 6 — Regular Session
- 20 — Regular Session
- 21 — CHANUKAH BRUNCH (10am -12 noon, with Shorashim, Location to be announced)

*FIG. 8*

Team B650

Snack Schedule —912

| | |
|---|---|
| September 6 | Travis Conley |
| September 13 | Jack Eastburn |
| September 20 | Peter Harlan |
| September 27 | Timothy Hedge |
| October 4 | Martin Hu |
| October 11 | Andre Keiser |
| October 18 | Rob Rudy |
| October 25 | Brook Seaman |
| November 1 | Joshua Sullivan |
| November 8 | New Player |
| November 15 | Team Party |

Palo Alto AYSO 1997 Game Schedule -- Team B606 http://www.best.com/~mouton/ayso/sch_b606.htm

Palo Alto AYSO    Home .. Calendar .. Fields .. Divisions/Schedules .. Policies .. Coaches .. Referees .. More Info

1997 Game Schedule -- Team B606 — 1010

9/01/97

| Date | Time | Opponent | Field | Notes |
|------|------|----------|-------|-------|
| 9/06 | 8:30 | B608 | El Carmelo Elementary School | — 1014 |
| 9/13 | 9:45 | B617 | Hoover Elementary School | Zac Slack |
| 9/20 | 11:00 | B604 | Old Ohlone Sch (on Charleston) | - Bryant |
| 9/27 | 8:30 | B612 | El Carmelo Elementary School | |
| 10/04 | 11:00 | B601 | Hoover Park (on Cowper) | |
| 10/11 | 9:45 | B610 | Addison Elementary School | |

REMEMBER! Teams playing the last game each day must put away the nets!

NOTE: This schedule covers only the start of the season. More to come...

Return to Division Schedule

FIG. 10

*Miss Lauren Ann Sargeant*
*and*
*Doctor Richard Roderick Burton* —1110
*together with their parents*
*request the honour of your presence*
*at their marriage* —1112
*on Sunday, the ninth of November* —1114
*Nineteen hundred and ninety-seven* —1116
*at one-thirty in the afternoon* —1118
*Saint Andrew's Episcopal Church* —1120
*13601 Saratoga Avenue* —1122
*Saratoga, California* —1124

*Reception and Dinner immediately following*
*Byington Winery, Los Gatos*

FIG. 11

|  |  |  | DECEMBER 1998 |  |  |  |
|---|---|---|---|---|---|---|
|  |  | 1 | 2 | 3 | 4 | 5 |
| 6 | 7 | 8 | 9<br>Sylvia:>>><br><br>John:>>> | 10 | Henry: 11<br>Meeting<br>with Bob<br>1-4 p.m. | 12 |
| 13 | 14 | 15 | 16 | 17 | 18 | 19 |
| 20 | John: 21<br>Dentist<br>Appointment<br>9:30 a.m. | 22 | 23 | 24 | 25 | 26 |
| 27 | 28 | 29 | 30 | 31 |  |  |

*FIG. 12*

INTERACTIVE DEVICE FOR DISPLAYING INFORMATION FROM MULTIPLE SOURCES

FIELD OF THE INVENTION

The invention relates to a computer display apparatus, and more particularly to a networked parasitic user interface terminal capable of deriving power from a host.

BACKGROUND OF THE INVENTION

Today, the typical setting for a personal computer system is still an office. Since personal computers started becoming prevalent over twenty years ago, many of them have been used for such applications as word processing (and other document preparation), financial calculations, and other office-related uses. They have not permeated the home environment, other than for games and for displaced office-type work, because they are not simple to operate.

During that time, the primary user-interface paradigm for interacting with computers has been a keyboard-and-screen system. Although this arrangement has been improved and refined over the years, it is still essentially the same arrangement that has been used with computers for many years, and was used on remote terminals even before the advent of personal computers.

The keyboard-and-screen system presents several advantages. The keyboard typically used with computer systems is an inexpensive item to produce. It includes only around 100 key switches, signals from which are encoded and sent to the CPU. Also, it is only slightly modified from the version used on mechanical typewriter keyboards for over a century. Hence, it is familiar to most people. Moreover, typewriter-style keyboards (or variations thereof) are usable to unambiguously input information in most Western languages.

However, for most people, a keyboard is not an efficient form of input. To use a keyboard effectively, training is required. Even with the requisite training, time and effort is necessary to enter information via keyboard, particularly when the information sought to be entered is already evident in a document or some other communication from another. Moreover, they are sensitive to spelling errors, repetitive stress injury (such as carpal tunnel syndrome and tendinitis), and inconvenience. Both hands are needed to use a traditional keyboard with any speed.

The display screens (or "monitors") typically used on personal (and other) computer systems have a number of advantages. They are relatively inexpensive. Years of producing television sets and computer monitors have resulted in manufacturing and design efficiencies and improvements in quality.

However, even with their improvements, CRT-based display screens are still typically bulky, heavy, and energy inefficient. They also produce a relatively large amount of heat. For these reasons, CRT displays have not been integrated into many other environments, and computers (and their displays) are usually treated as stand-alone items. Other display technologies have been tried, including plasma displays and liquid crystal displays (LCDs), to name two, but have been less successful because of their relatively high cost and low image quality in comparison to CRT displays. However, LCD prices have been dropping in recent years, and such displays are beginning to be found in a variety of applications.

While the keyboard-and-screen scheme for interacting with computers has proven to be satisfactory in many ways for a long time, there are some problems that are not easily resolved with such a system. For example, there can be a lack of correlation between what is displayed on the screen and what is entered on the keyboard. Any formatting information available on the screen must be entered via sequences of keystrokes on the keyboard, and those sequences in many cases are not intuitive. Furthermore, many symbols and items viewable on the screen can not easily be entered via keyboard.

Recently, however, progress has been made in the usability of alternative user interface schemes. For example, touch-screen-based systems, in which a flat-panel display (such as an LCD) is overlaid with a translucent pressure-sensitive (or other type of touch-sensitive) surface, have been gaining in popularity. Such a system allows the user to directly manipulate the information that is shown on the display. For example, various gestures can be made on the surface to copy, move, annotate, or otherwise alter information on the display. Where such a system falls short, however, is in data input. Where there is no keyboard associated with a touch screen, then data must be input via interaction with the touch-sensitive surface. In some cases, this involves handwriting recognition, which is an imperfect and computationally intensive procedure, or some other means, such as "pressing" (with a stylus or fingertip) a visually displayed keyboard, or by special gestural symbols designed for data entry.

Voice recognition input has also made some progress in recent years. In the past, voice recognition systems have been used primarily in experimental environments. Typically, error rates were extremely high, and to accomplish real-time recognition, the computational resources required were prohibitively high. Recently, however, several commercial software products have made it possible to offer real-time voice recognition on personal computers of the type frequently used in the home. However, such voice recognition systems are speaker-dependent, and as such require a significant amount of training to attain a satisfactory level of performance and a low enough error rate. Moreover, when errors are made (such as in the recognition of homonyms and proper names), it is frequently more convenient to type the corrected word with a traditional keyboard than it is to correct the error by speaking the necessary voice commands and spelling the word for the system. Accordingly, voice recognition shows some promise for the future, but at the present time, is not a practical method of operating and providing input to a personal computer.

Despite promises of cross-platform integration (e.g., computer and television, computer telephony), there is usually little relationship between the data on a personal computer and most of the documents and other tools used for communication and information exchange that are found around a typical individual, office, or family. For example, in a typical home or office, one might find a telephone, an answering machine (or voicemail system), audio equipment (such as a stereo), a fax machine, a television, a computer and printer, a whiteboard or a chalkboard, and various written notes, lists, calendars, mailings, books, and other documents. Unfortunately, the information in one or more of those repositories is usually tied to that repository. For example, addresses in a written address book are not easily used on a computer e-mail system, unless the user goes to the trouble of manually transferring the relevant information from the address book to the computer.

Furthermore, there is a well-known lack of compatibility between systems of different types, even those systems that are designed to work together. For example, in the conversion between one data format and another, there may be a loss of formatting or other information. Furthermore, errors may creep into the conversion, as when optical character recognition (OCR) is used to convert a printed document to a machine-readable one.

Because of these obstacles, the numerous disparate data types and formats persist in the home and office environments. For example, written notes on a family's refrigerator door are frequently a useful and convenient means of communication. The kitchen is often a place of gathering, or at least a place where each family member will visit several times every day. Accordingly, when one family member wishes to communicate with another that he might not see in person, then he might write a short note and post it to the refrigerator door with, for example, a magnet. Other documents, such as calendars, computer printouts, facsimiles, and collaborative lists can also be posted to the refrigerator door.

Several companies have introduced limited-function kitchen computers, or software for general-purpose personal computers to enable kitchen functionality. Such kitchen computers usually provide the ability to store recipes, create shopping lists, and take rudimentary notes. However, in most cases, these kitchen computers use the standard keyboard-and-screen user interface, and are highly limited in function. Kitchen computers generally do not have very well-developed document handling or telephony functions.

A class of portable computers known as personal document readers (or PDRs) has also arisen in recent years. The goal of these devices is to serve as a replacement for a printed book. Accordingly, a typical PDR is relatively light in weight, but has a large high-contrast screen to enable easy reading. Recent PDRs also have other capabilities, such as the ability to annotate a document (either via a built-in keyboard or a touch-sensitive screen adapted for writing with a stylus). Known PDRs are generally limited in function, but as will be discussed below, can frequently be used as an input/output terminal in an embodiment of the invention to be disclosed herein.

Another class of systems uses what is known as a "paper user interface," in which commands are conveyed to the system by making marks on paper, which is then scanned. For example, one category of such devices is able to read free-form ink (or digital) annotations to determine which of several possible editing operations a user wishes to perform on a document. See, e.g., U.S. Pat. No. 5,659,639 to Mahoney and Rao, entitled "Analyzing an Image Showing Editing Marks to Obtain Category of Editing Operation." Other versions of "paper UI" systems are capable of interpreting drawn symbols as commands, deriving commands from marked-up forms (e.g., checkboxes) attached to a scanned document, and reading pre-printed one- or two-dimensional data codes (such as Xerox DataGlyphs). For a summary of the state of the art in this area, see, for example, U.S. Pat. No. 5,692,073 to Cass, entitled "Formless Forms and Paper Web Using a Reference-Based Mark Extraction Technique."

Such techniques can also be extrapolated to other media, such as office whiteboards. See, e.g., U.S. Pat. No. 5,528,290 to Saund, entitled "Device for Transcribing Images on a Board Using a Camera Based Board Scanner," and U.S. Pat. No. 5,581,637 to Cass and Saund, entitled "System for Registering Component Image Tiles in a Camera-Based Scanner Device Transcribing Scene Images." An all-electronic system for accomplishing essentially the same result is Tivoli, an electronic collaboration tool that uses Xerox LiveBoard hardware. See Pedersen, E. R., McCall, K., Moran, T. P., and Halasz, F. G., "Tivoli: An electronic whiteboard for informal workgroup meetings," Proceedings of the InterCHI'93 Conference on Human Factors in Computer Systems. New York: ACM (1993).

While all of the foregoing systems are beneficial and useful in certain limited situations, they are all directed to solve limited problems. Accordingly, while they may be useful in an office setting, they might not easily transfer to other settings. Accordingly, there is a need for a document and information management system that is easier to use than traditional systems, yet powerful enough to be adaptable to numerous situations. Such a system should simplify the user's work, even if it does require some input and assistance. It should be able to handle documents and input in a variety of formats, structures, and media, including printed, written, and spoken communications.

SUMMARY OF THE INVENTION

This invention builds upon the limited successes of prior systems in an attempt to create a comprehensive document handling system and method, useful in home and office environments, that is intuitive, easy to use, powerful, and relatively ubiquitous by way of its incorporation into other traditional channels of communication.

It requires no structural changes to its source documents, yet it is able, with minimal assistance, to extract information for use in an information database system. It is capable of accepting input from a large number of sources, including documents in the physical and digital domains, and in many different media types, including printed documents, handwriting, audio messages, and electronic messages. To do this, the system and method of the invention rely upon the analysis of information from multiple sources, including, when necessary, limited user input. The end result is a product that is usable in either digital or physical form, breaking down the barriers between the digital and physical document worlds, and allowing essentially all types of information to be exchanged with a minimum of difficulty.

The invention relies upon the recognition and analysis of document genre structure rather than content. The document genre guides the extraction of useful information, while reducing the need to recognize and parse each document in its entirety. This reduces errors and computational expense.

Accordingly, an interactive display device according to the invention, adapted for use in an information management system as described above, includes an imaging display, a power interface adapted to receive data parasitically from a host structure, and a bi-directional data communication interface. Most processing performed by the information management system is performed at a location remote from the display device, so the display device is adapted specifically for use as a user interface tool that can be mounted at a convenient and accessible location.

BRIEF DESCRIPTION OF THE DRAWINGS

FIG. 7 is an exemplary school schedule capable of being processed by the calendaring system of FIG. 4;

FIG. 8 is an exemplary program schedule capable of being processed by the calendaring system of FIG. 4;

FIG. 9 is an exemplary school snack schedule including superfluous information capable of being processed by the calendaring system of FIG. 4;

FIG. 10 is an exemplary soccer game schedule capable of being processed by the calendaring system of FIG. 4;

FIG. 11 is an exemplary wedding invitation capable of being processed by the calendaring system of FIG. 4;

FIG. 12 is an exemplary electronic output calendar capable of being generated by the calendaring system of FIG. 4;

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
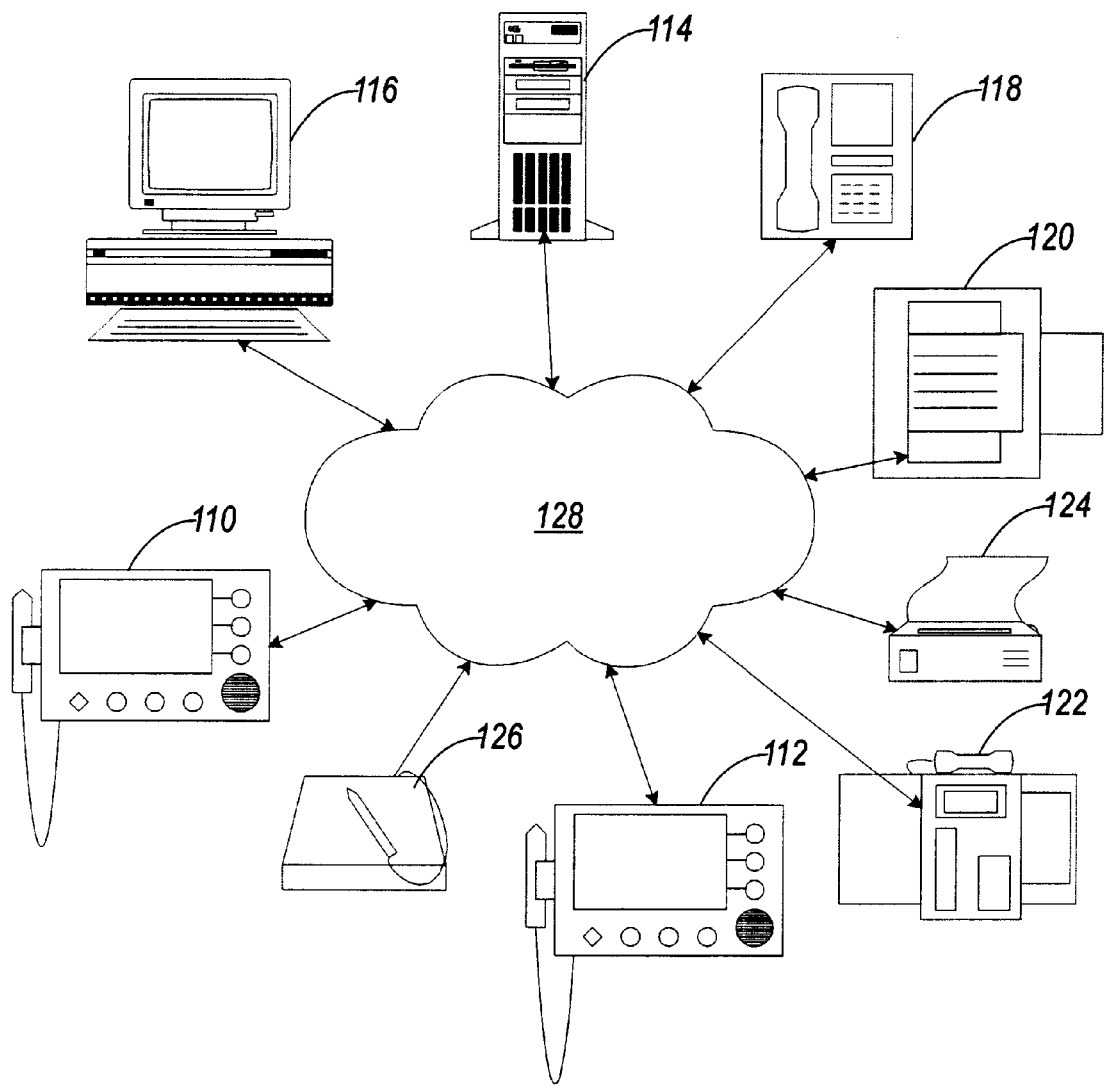
FIG. 1 is a schematic diagram illustrating various exemplary physical components of a networked document processing and database system according to the invention.

Referring initially to FIG. 1, a distributed network for information management and sharing according to the invention is shown in schematic form. As will be described in further detail below, the present invention is adapted to facilitate the extraction and use of significant information in documents of many kinds, including (but not limited to) papers, handwritten notes, business cards, e-mail messages, audio messages, and the like, without any appreciable advance knowledge of the content or format of the documents, but with some knowledge of the "genre" or context of the documents. As will be apparent from the description below, the system is adapted for distributed access and either centralized or distributed processing.

As used herein, the term "document" refers to any persistent communication or collection of information, whether fixed in a tangible medium (such as a hardcopy) or stored electronically, and whether in machine-readable or human-readable form. A document "genre" is a culturally defined document category that guides the document's interpretation. Genres are signaled by the greater document environment (such as the physical media, pictures, titles, etc. that serve to distinguish at a glance, for example, the *National Enquirer* from the *New York Times*) rather than the document text. The same information presented in two different genres may lead to two different interpretations. For example, a document starting with the line "At dawn the street was peaceful . . ." would be interpreted differently by a reader of *Time Magazine* than by a reader of a novel. Below (and in conjunction with FIGS. 7–12), a variety of calendars will be discussed; each one represents a different instance of the calendar genre. As will become clear from the discussion below, each document type has an easily recognized and culturally defined genre structure which guides our understanding and interpretation of the information it contains. That structure is used as the basis of certain aspects of this invention.

Two user terminals 110 and 112 each with a flat-panel display, a remote CPU 114, a traditional personal computer 116, a telephone device 118 with integrated telephone answering device (TAD) functionality, a document scanner 120, a fax machine 122, a printer 124, and a handwriting input tablet 126 are all coupled to a communications network 128. The network 128 may be any type of known network, such as an Ethernet local-area network (LAN), a wireless LAN (either RF or infrared), a wide-area network (WAN), or even the Internet. Moreover, the network 128 may comprise only the illustrated devices, connected in a peer-to-peer topology, or may include numerous other disparate devices, whether or not designed to operate with the present invention. As will be appreciated by individuals of skill in the art, numerous other network topologies and protocols may be used in an implementation of the current invention without departing from its scope. However, the functional interoperation of the illustrated devices will be considered in detail below.

Figure 2:
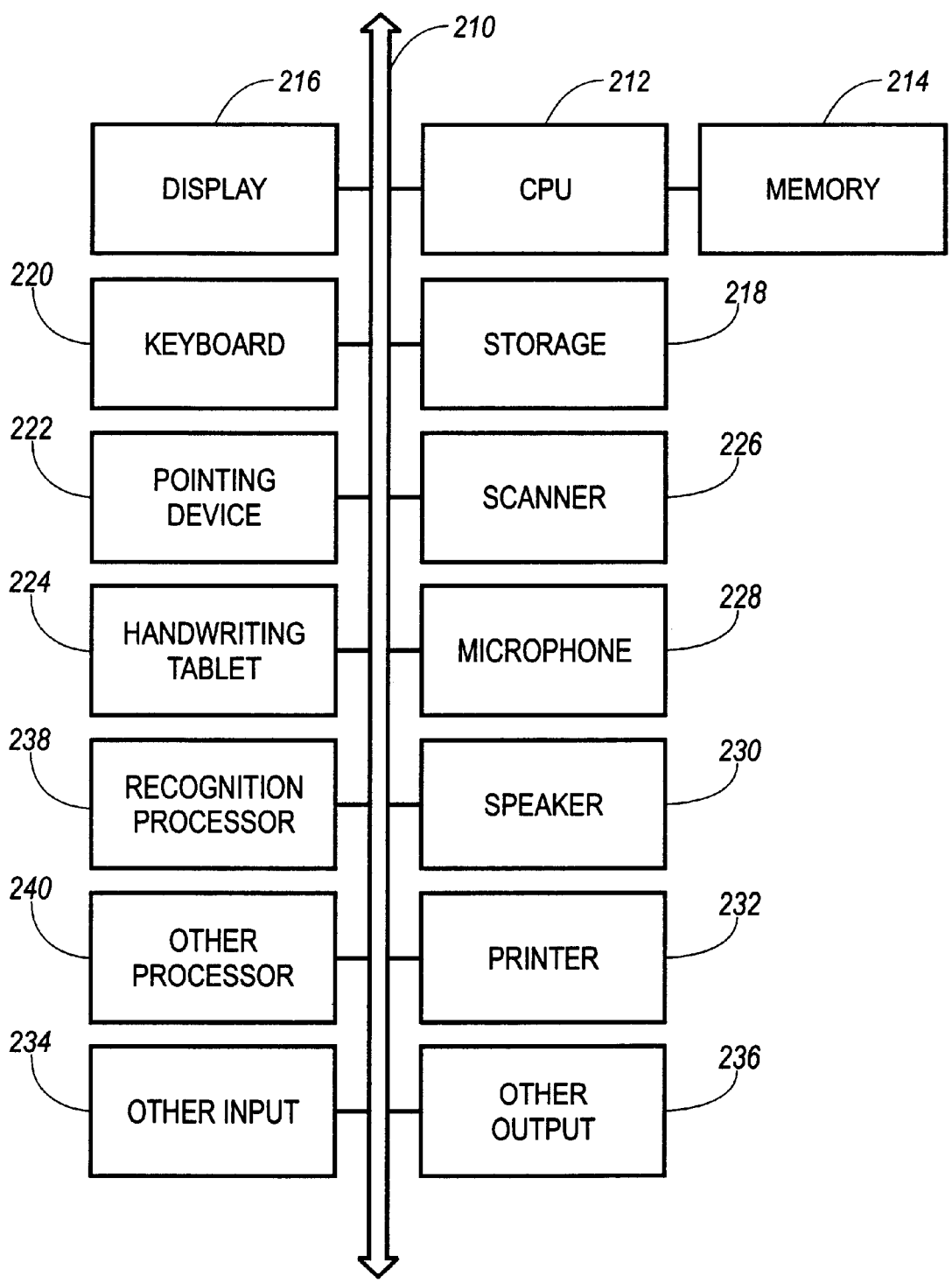
FIG. 2 is a block diagram illustrating various exemplary functional components used in a network according to FIG. 1.

FIG. 2 is a functional block diagram illustrating the functions performed by the physical components set forth in FIG. 1. The network 128 (FIG. 1) is provided in the form of a bi-directional communications link 210, to which a central processing unit (CPU) 212 and memory are attached. The CPU 212 is adapted to perform most of the invention's processing, but it should be noted that in an alternative embodiment of the invention, processing may be distributed over the network 128. Preferably, the CPU 212 is attached to a memory 214, which may be used to store, among other things, genre specifications used in document analysis (explained below), character models used for character recognition, voice models used in speech recognition, and other data used by the system.

A display 216 is also provided; it may be local to or remote from the CPU 212, and may be able to decouple from the network 128 for portability (as in a Personal Digital Assistant or PDA). An exemplary embodiment of the display 216 will be described in further detail below. Long-term storage 218 for the information database of the invention, which stores document information for later use, is also provided and connected to the communications link 210. Various input devices are attached to the link 210, including a keyboard 220, a pointing device 222 (such as a mouse, trackball, or light pen), a handwriting tablet 224, and a scanner 226. These devices are adapted to receive information and transmit it to the CPU 212 for processing.

It should also be recognized, however, that certain document types need not enter the system through any of the foregoing input devices. For example, an e-mail message received by the PC 116 need not be converted into the digital domain, as it is already in electronic form. The same is true for facsimile message; however, the latter may still need to be converted from a bitmap into a machine-readable code.

An audio interface, including a microphone 228 and a loudspeaker 230, facilitate the entry and use of audio documents (such as recorded memos). As suggested by FIG. 1, the microphone 228 and loudspeaker 230 may be integrated into a telephone device 118 or any other convenient apparatus attached to the network 128.

A printer 232 is provided for hardcopy output. It should be recognized that the foregoing input and output devices are exemplary only, and numerous other input devices 234 and output devices 236 may be used in accordance with the invention. Moreover, additional processors, such as a recognition processor 238 or any other processor 240 may be used to off-load some of the computational burden from the CPU 212. It is contemplated that the recognition processor 238 would be used to process audio from the microphone 228, handwriting from the tablet 224, or printed documents from the scanner 226, for example. In each case, the raw input would be translated to a machine-readable counterpart (e.g., speech would be converted to recognized text via a speech recognition algorithm, handwriting would be converted to recognized text or command gestures via a handwriting recognizer; or printed documents would be converted from a bitmap to text via optical character recognition).

Figure 3:
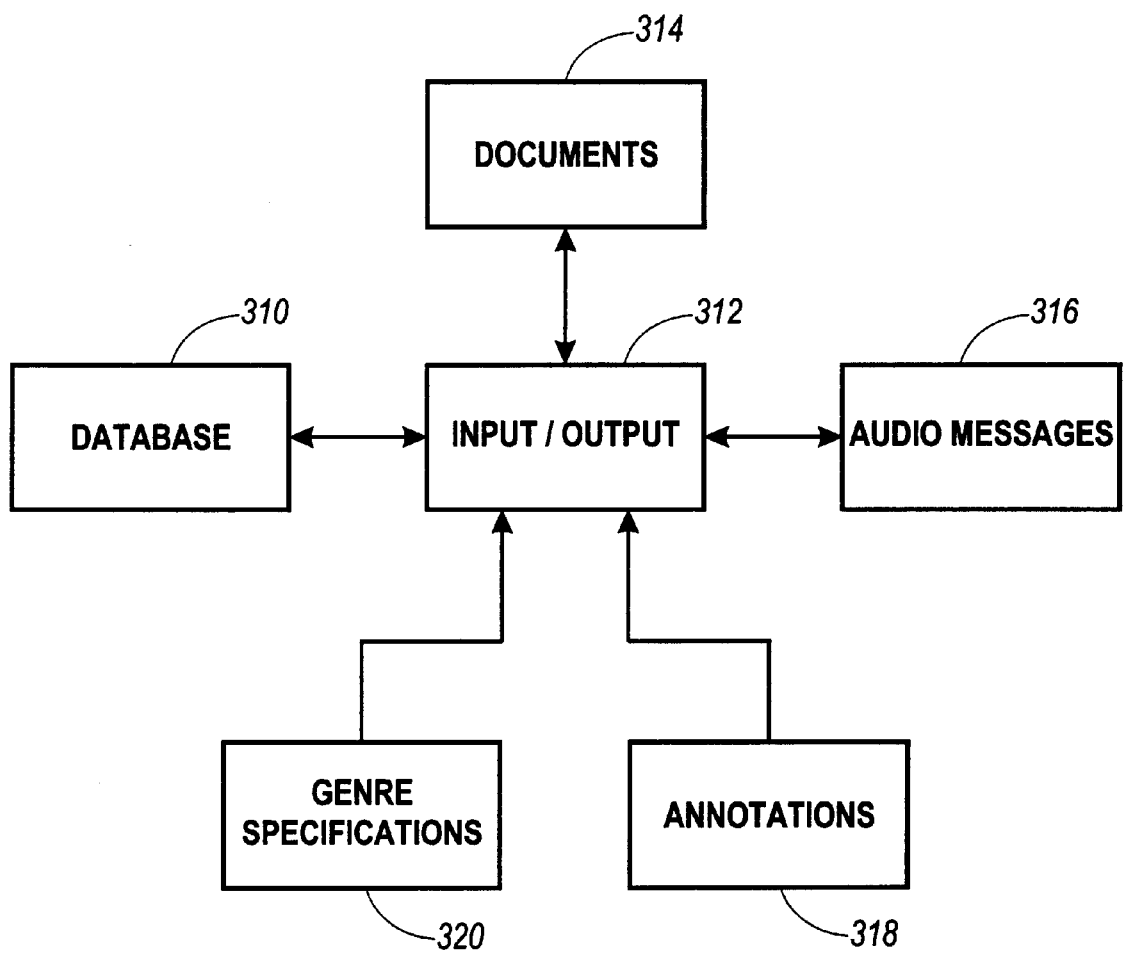
FIG. 3 is a block diagram providing a high-level functional overview of an information management system according to the invention.

The basic function of the overall system is illustrated by the block diagram of FIG. 3. A database 310 (preferably hosted by the storage 218 and managed by the CPU 212 of FIG. 2) serves as a repository of document information, specifically that information which has been deemed to be significant in documents processed by the system, and is coupled to an input/output subsystem 312, functionally illustrated in FIG. 2 above. The input/output subsystem 312 may include some or all of the display 216, the keyboard 220, the pointing device 222, the handwriting tablet 224, the scanner 226, the microphone and speaker 228 and 230, the printer 232, other input and output devices 234 and 236, as well as the logic used to control those devices, including the recognition processor 238, any other processor 240, and certain functions of the CPU 212. The input/output subsystem 312 is capable of handling documents 314, audio messages 316, and annotations 318, in accordance with detailed methods set forth below.

Input to and output from the database 310 are processed by the system with the assistance of guidance provided by a set of genre specifications 320 (preferably stored within the memory 214 of FIG. 2). The genre specifications 320 provide information on the expected nature, structure, and content of documents handled by the system. In particular, for input documents, the genre specifications 320 preferably indicate where certain data items are likely to be found within a document, the format of those data items, and other considerations of utility in the information extraction process. With regard to output documents, the genre specifications preferably indicate how to assemble data from the database 310 into human-readable documents in a manner consistent with what the user expects. The mechanics of this interaction will be considered below with reference to several detailed examples.

Calendaring System

Figure 4:
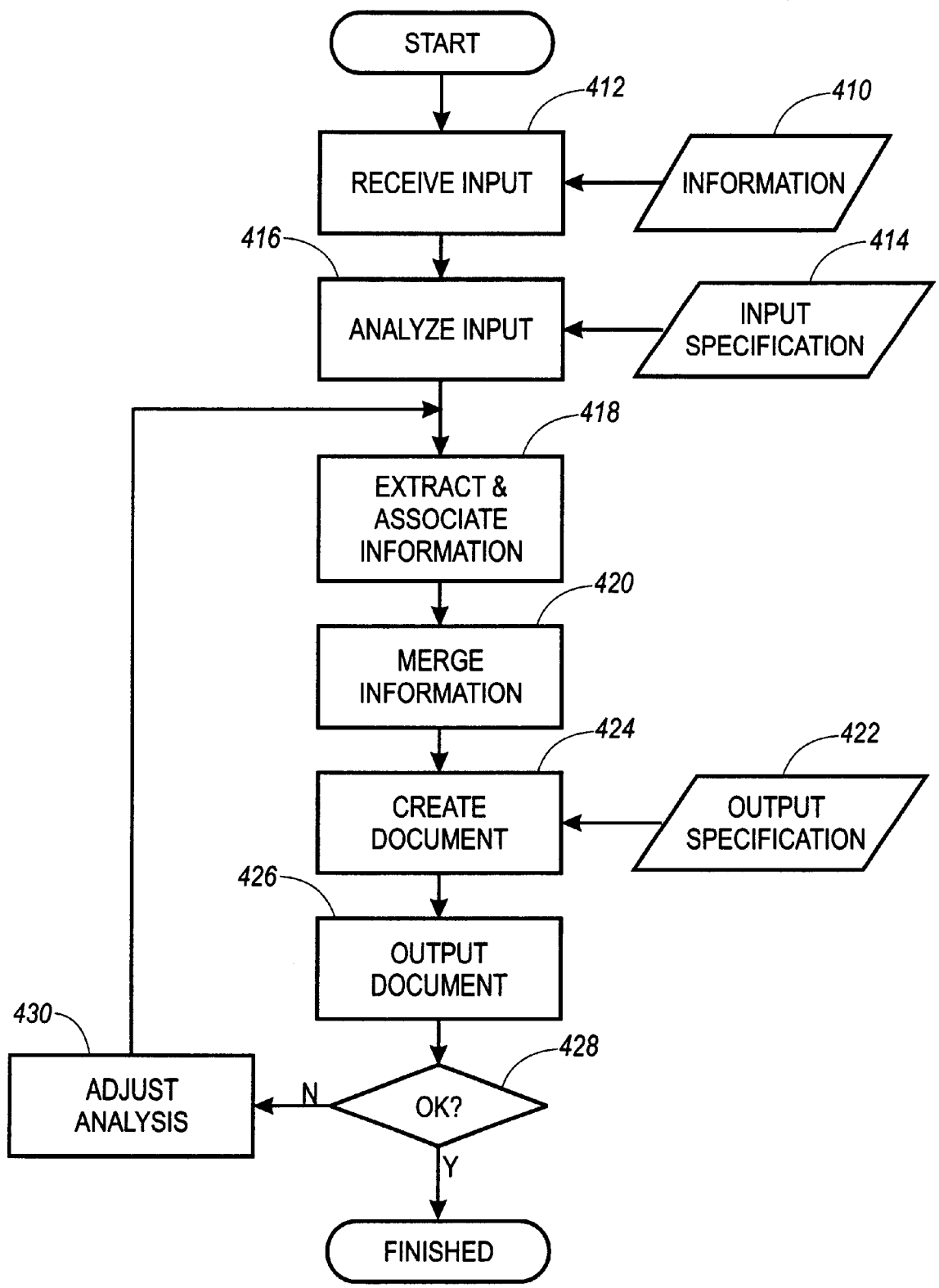
FIG. 4 is a flow chart illustrating the steps performed in an exemplary calendaring system according to the invention.

A specialized application of the general system of FIGS. 1–3 is set forth and illustrated in FIG. 4. FIG. 4 represents the processes performed in a system adapted to extract appointment and other date/time information from various documents and inputs to the system, and to synthesize a calendar from the information then stored in the database 310 (FIG. 3).

Date and annotation information 410, stored as part of a calendar document, is an input to this method, which begins by receiving the date and annotation information (step 412). As suggested above, this input can occur in any of a number of ways: by scanning one or more paper documents with a sheet-fed scanner or a scanning pen, by selecting certain e-mail messages or Web pages for processing, or by providing an audio recording of a voice message, for example. A collection of one or more source documents is provided to the system. Consequently, the source documents can be, for example, paper or other physical documents, or can also be "raw bits," such as unrecognized image or speech data, or formatted data, such as ASCII or HTML. Each source document is assumed to represent a genre structure recognizable by the system. Each source document is further assumed to contain one or more key pieces of information, each such key being associated with a message that the user (or another person) would find significant. For example, if the genre is associated with a particular sort of calendaring event (such as a schedule) then the keys can be dates or times, and the messages can be announcements of scheduled events corresponding to these dates or times.

Typically, and importantly for the average user, the source documents are provided to the system in physical rather than digital form. In this case, the system captures the documents and converts them to digital form. For example, a paper document can be optically scanned by a whole page scanner or a scanning pen to produce unrecognized image data, which can then be further converted as by segmentation, optical character recognition (OCR), sketch analysis, and the like. An audio recording can be digitized and, if the recording contains speech, the speech can be recognized by a speech recognizer. Depending on the particular system, the documents may include data in any number of forms, such as textual, graphic, pictorial, audio, or video data. Streaming and static data are both acceptable. The greater the system's ability to accept physical rather than digital documents as input, the better it can integrate seamlessly with everyday practice.

At the time of document input, the genre of the document input is determinate, and is observable by the user. The document's genre is used to select a particular input specification 414, which is used to assist further processing of the input document. As will be appreciated by individuals of skill in the art, various means of specifying an input genre are possible; one exemplary method is described below with reference to FIG. 27. Moreover, the system may be programmed to expect documents having a particular genre. It is also possible for a system according to the invention to attempt to heuristically determine the genre of an input document without further user input. This is particularly possible when documents of different types and genres are being received from different sources (e.g., e-mail messages might usually have a certain genre, while facsimile messages might have a different usual genre).

For example, a particular input document may represent the genre of calendars. The characteristics of this genre are indicated by the selected input specification 414, chosen from a library of possible genre specifications. While, in general terms, a system according to the invention is able to process many different document genres, it is important to note that a single instance of the system may be equipped to only process a single genre type, such as calendars. Even so, there may be many different kinds of calendars, such as schedules, appointment books, and the like (some of which will be discussed in further detail below), all of which may be defined by a single input specification 414 or, if necessary, by multiple input specifications. For purposes of this discussion, all documents within the calendar genre are considered to have similar structures, including the key information set forth above.

The input specification 414 is employed to analyze the input (step 416) and identify information of interest. This operation may occur automatically (see FIG. 5) or semi-automatically (see FIG. 6) with some user interaction. The identified information (which for the calendar genre typically includes at least a date, a time, and an event title) is then extracted and associated (step 418) into a record corresponding to a single event. The record is then merged (step 420) into the database 310 (FIG. 3).

Alternatively, and preferably, the entire input document (or as much as is available) is merged into the database 310 and is indexed and referenced by its extracted records. This facilitates the ability to "look behind " the extracted event for additional information, if it proves to be necessary or desirable to do so. For example, an exemplary output calendar (see FIG. 12) may contain only a summary of information obtained from one or more input documents. When this is the case, the user can be given the opportunity to "select" an event, thereby revealing further information, possibly including a digitized bitmap of the entire input document from which the event was extracted. This capability provides an useful safeguard, reducing the possibility (and impact) of an error by the system.

When the user wishes to create output, an output specification 422 is selected. The output specification identifies and describes the characteristics of the user's desired output genre. For example, the user may wish to create a monthly calendar containing all family events for the month of December, 1998. The output specification 422 fully describes the format of that document, but does not contain any of the information from the database 310. Accordingly, the document is created (step 424) from the information in the database 310 and the output specification 424 and is outputted (step 426) to the user.

Given the automatic or semi-automatic processing of document information, it is entirely possible that the system failed to correctly identify the proper dates and times, for example. Accordingly, the user is given an opportunity to review the output document and to indicate to the system whether it is correct (step 428). If not, the analysis is adjusted (step 430), and information is extracted once again. As will be appreciated by individuals of ordinary skill in the art, this can be accomplished by several means, including but not limited to adjusting the parameters used to perform the analysis, by reverting to alternate choices in a weighted list of possibilities, or by accepting user guidance. To facilitate changing the analysis, it is contemplated that the database 310 continues to contain full document instances, in addition to the analyzed information derived in steps 416–418. Although the adjustment step 430 is presented herein as occurring after output has been generated, it should be noted that adjustment by any of the means set forth above can occur in any step of the process, for example immediately after character recognition is performed, or before the information is stored in the database.

Figure 5:
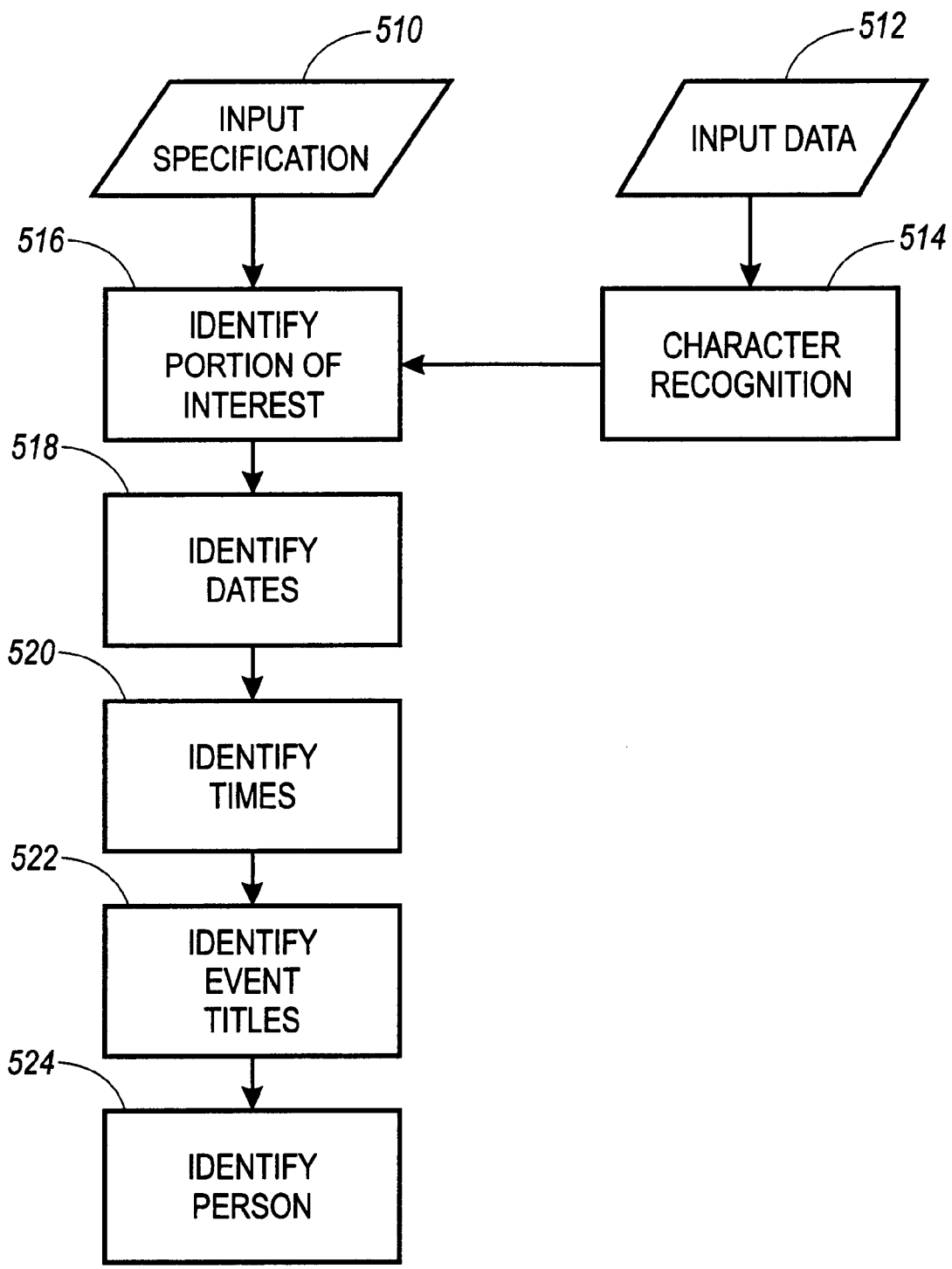
FIG. 5 is a flow chart representing the steps performed in an automated input analysis step as performed in the method set forth in FIG. 4.

FIG. 5 illustrates the process followed by an automatic version of the input analysis aspect of FIG. 4. Beginning with an input specification 510 and input data 512, character recognition (step 514) is performed on the input data 512, if necessary to translate the document into a machine-readable format.

From the recognized input, the portions of interest are identified (step 516). As will be appreciated by individuals of skill in the art, there are many ways to accomplish this; one method includes simply scanning for numerals, while another method scans for all potentially relevant types of information, such as numerals, names of months, names of days of the week, the phrase "o'clock," etc. From the portions of interest, the system then extracts the necessary dates (step 518), times (step 520), and event titles and other annotations (step 522), and if necessary, the applicable person (step 524). Dates and times, in particular, have reasonably well-defined structures that assist the system in identification. These characteristics will be discussed in further detail below (see FIGS. 18, 21, 22, and 23). In a household or business, names might also be readily identifiable (for example, by checking against a list of valid names).

Figure 6:
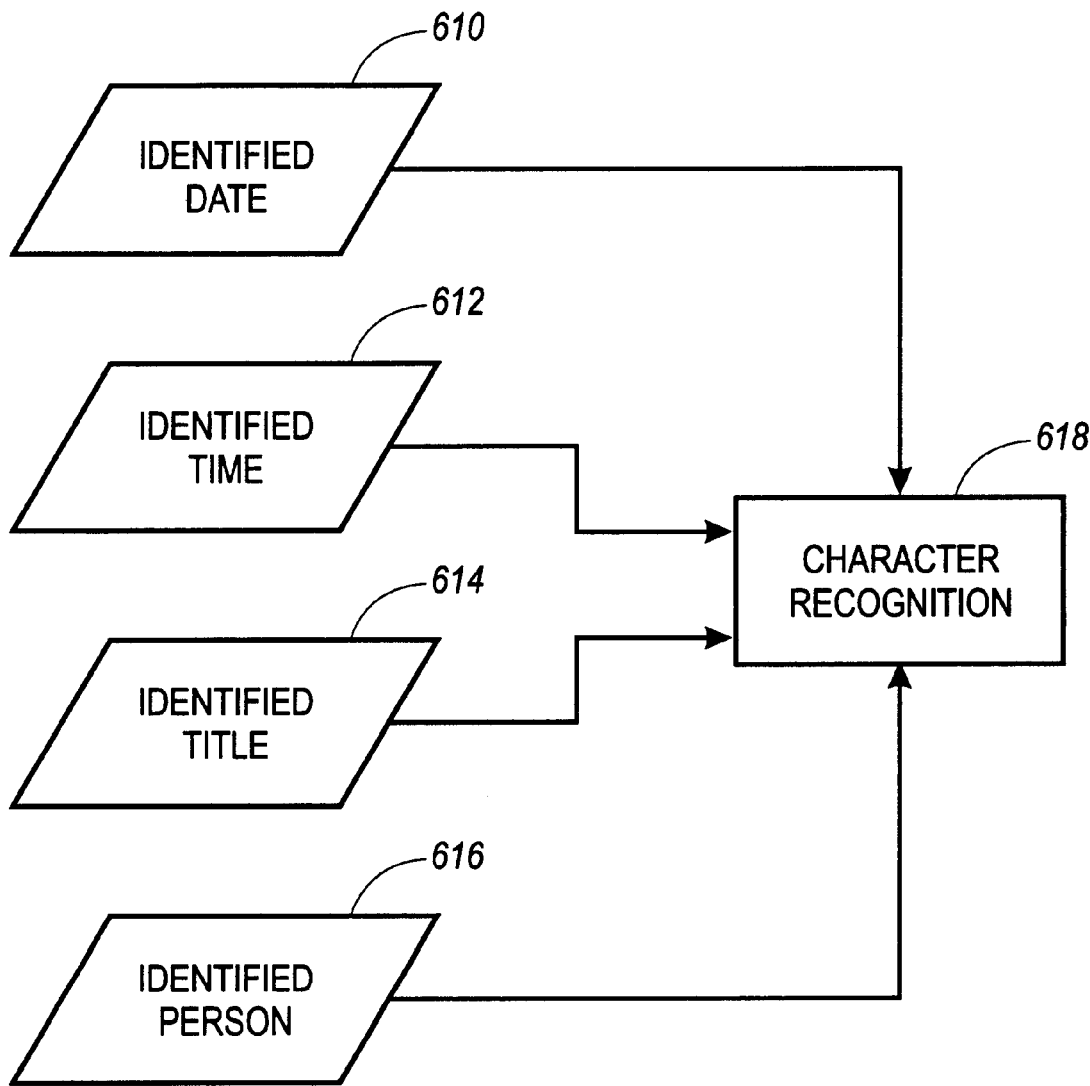
FIG. 6 is a flow chart representing the steps performed in a semi-automated input analysis step as performed in the method set forth in FIG. 4.

Referring now to FIG. 6, which illustrates a semi-automatic version of the input analysis step of FIG. 4, a date 610, a time 612, an event title 614, and a person 616 are all identified by the user. Then, to facilitate extraction and indexing into the database 310 (FIG. 3), character recognition 618 is performed on the date 610, time 612, title 614, and person 616.

Clearly, in any particular document, at least one of the foregoing data items may not be present; for example, in a calendar might not include a time for an all-day event. In this case, the system may allow for the manual input of the omitted data item, or may alternatively continue to operate without it. As will be discussed in further detail below, the user identification of the data items 610–616 may operate by writing guiding annotations on a hardcopy document (which is then scanned), by using a scanning pen to input data fields in succession, or by any other similar method. In a more automatic alternative embodiment, user identification only requires "pointing at" a particular item; the system then uses character or pattern recognition to determine the extent of the written data field.

The manual input called for above may be accomplished via a keyboard, handwriting recognition, or simple selection of options via a pointing device, as circumstances require.

A detailed example of the calendaring system in operation will now be presented. It shows how a user can use one particular input mechanism, in this case a smart scanning pen (one embodiment of which will be discussed in further detail below), to analyze structure and merge calendar data from a variety of document genres. Note that as discussed above, a scanning pen is not the only possible means of input. Rather, the scanning pen is used for ease in describing the invention, which deals more with the source documents once they have been acquired.

Figure 24:
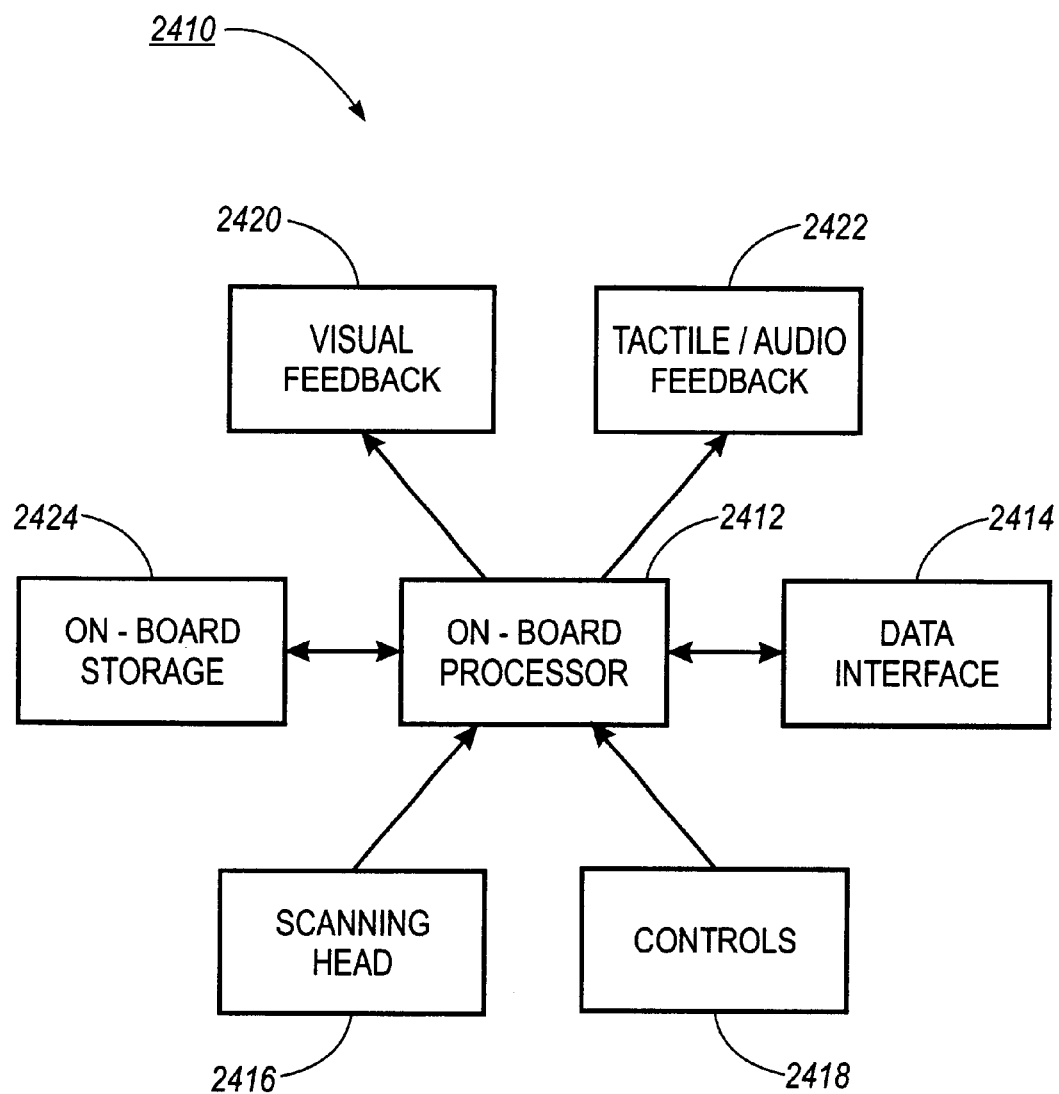
FIG. 24 is a functional block diagram illustrating the components of an exemplary moded scanning pen according to the invention.

In the particular embodiment described in this section, the user interacts with a smart scanning pen augmented with a single button or any other user control (one embodiment of which is illustrated in FIG. 24)—this button, when clicked, indicates to the system that a new appointment is being entered. The user's primary interaction with the scanning pen, once the button has been clicked, is to perform a series of "swipes" with the scanning pen across the surface of the document. Each such swipe yields a bitmapped portion of a text page. This bitmapped portion is then analyzed and converted to digital text via optical character recognition (either on the pen itself, as part of the transfer to the system, or possibly later in the process by another component of the system), and analyzed with genre-specific heuristics.

The set of scanned events is transferred from the pen's local storage to the calendar system. A variety of standard mechanisms are available to accomplish this. In one embodiment of the invention, the scanning pen bears an infrared (IR) transmitter near the end farthest from the scanning tip. When the pen is "flicked" (or quickly pointed) in the direction of a host coupled to the network 128, the information is transmitted to the host (which must have an IR receiver ready to receive said information). Less exotic solutions are also possible, including but not limited to a docking station or even a serial cable.

An example of the scanning pen in use in the calendaring system operating as set forth in FIG. 4 is provided below. A click of the pen's button is indicated with the symbol CLICK, and a swipe of text is indicated by enclosing the text in double-quotes.

An exemplary school schedule is shown in FIG. 7. Note that the structure is of the schedule is self-apparent: it is a schedule of times when something (in this case school) is "on" and times when it is "off". Several additional refinements of this structure are present, including the application to particular subgroups (e.g., grades 1–3) or particular ways of being "off" (e.g., holidays). Suppose that a user wishes to enter the daily dismissal times into the system. Then an exemplary scanning sequence to accomplish this could be:

CLICK
"Regular Daily" (710)
"Dismissals" (712)
"2:45 PM" (714)
CLICK
"Every Wednesday Starting Sep. 3, 1997" (716)
"Dismissal for Grades 1–5" (718)
"1:30 PM" (720)

From the first swipe 710, "Regular Daily," the system can determine that the time of the appointment recurs daily—that time, furnished in the third swipe 714, is 2:45 PM. The system treats the second swipe 712 as an annotation for the event, as its data is not recognizable as either a date or a time.

From the fourth swipe 716, the system can determine the frequency and day of the second appointment. The fifth swipe 718 annotates that appointment, and the sixth and final swipe 720 provides the recurring time.

FIG. 8 illustrates an exemplary program calendar. This type of calendar is similar to the school example above (FIG. 7) in that it sets forth another schedule, this time oriented around the 12-month calendar rather than canonically. Suppose that the user wishes to enter into the system both events for September 816 and 822 and the Chanukah brunch 828 in December. A scanning sequence to accomplish this could be:

CLICK
"MiDor L'Dor" (810)
"September" (812)
"14" (814)
"KICK OFF PICNIC" (816)
"12 noon–2 pm, with Shorashim, at Mitchell park" (818)
CLICK
"20" (820)
"MiDor L'Dor begins" (822)
CLICK
"MiDor L'Dor" (810)
"December" (824)
"21" (826)
"CHANUKAH BRUNCH (10 am–12 noon, with Shorashim," (828)

In the first swipe sequence, swipes 812, 814, and 818 contain date/time information, and are analyzed accordingly. Swipes 810 and 816 don't, and so serve to annotate the event.

In the second swipe sequence, the only date information is contained in swipe 820, "20". This is an incomplete portion of a date, so the month and year are carried over from the previous event. Swipe 822 serves to annotate the event.

In the third swipe sequence, swipes 824, 826, and 828 contain the date information. Swipes 810 and 828 contain other information, and so annotate the event. Note that swipe 828 contains both date and annotation information.

The third calendar type, a snack schedule, is shown in FIG. 9. This, once again, is similar to the other schedules (FIGS. 7–8); the difference here is that only one entry is relevant to the user (the date of a particular person's snack assignment). Suppose that the user wishes to enter the October 18 event. A scanning sequence to accomplish this could be:

CLICK

CLICK
"October 18      Rob Rudy" (910)
"Snack Schedule" (912)

"Snack Schedule" (912)
As in the previous example, one swipe 910 contains both date and annotation information. The second swipe 912 contains only annotation information. Hence, the event will be entered with a date of October 18, and with an annotation of "Rob Rudy, Snack Schedule."

A fourth calendar type, a web page, is shown in FIG. 10. This is still a schedule, but one kept primarily in the digital domain (though it can be printed in hardcopy format). Suppose that the user wishes to enter the September 6th event. A scanning sequence to accomplish this could be:

CLICK

"Game Schedule—Team B606" (1010)

"9/6 8:30" (1012)

"El Carmelo Elementary School" (1014)

The second swipe 1012 serves to completely specify the date—the other swipes 1010 and 1014 serve as annotation. Like other events, it is possible that the user may wish to add additional annotation beyond that already printed on the document—for example, in this case, directions to the school, or which child is on team "B606", and so forth. This can be either done later in the process through the system's user interface (e.g., one of the terminals 110 or 112 of FIG. 1), or, in an alternative embodiment, by allowing the scanning pen to write as well as read—the user writes additional "swipe" text himself.

As shown in FIG. 10, the name "Sam" 1016 is handwritten on the calendar. In an embodiment of the invention, a handwritten note like this one can be used to further annotate the record of the September 6 game. Preferably, the scanning pen used to input the other data on the calendar of FIG. 10 is also able to write on a hardcopy document (while simultaneously recording the physical gestures that make up the handwritten note), or to "mark up" a digital document such as a Web page. Alternatively, a previously-handwritten note can be scanned and digitized with a swipe of the scanning pen. In either case, this handwritten information, after being converted to a machine-readable format via handwriting recognition or some other means of parsing gestural symbols, is associated with the scanned record and stored in the database 310 (FIG. 3).

When the pen is used to "mark up" a digital document, it should be noted that there is no need for the pen to actually scan any information in the underlying digital document, as the document is already in the digital domain. Rather, it is sufficient for the scanning pen to indicate to the system the location of each swipe, from which the underlying information can be extracted.

The fifth calendar type, a wedding announcement, is shown in FIG. 11. Suppose that the user wishes to enter the event into the system. A scanning sequence to accomplish this could be:

CLICK

(23) "Doctor Richard Roderick Burton" (1110)

(24) "marriage" (1112)

(25) "Sunday, the ninth of November" (1114)

(26) "Nineteen Hundred and ninety-seven" (1116)

(27) "at one-thirty in the afternoon" (1118)

(28) "Saint Andrew's Episcopal Church" (1120)

(29) "13601 Saratoga Avenue" (1122)

(30) "Saratoga, California" (1124)

Swipes 1114, 1116, and 1118 specify the date and time of the event. Swipes 1110, 1112, 1122, and 1124 serve to annotate the event. The address is set forth in swipes 1120, 1122, and 1124—this information can remain part of the annotation or can be extracted by the system as described below. Note that this further information can be displayed in a hierarchical fashion, concealing details until needed. Moreover, in one embodiment of the invention, the entire announcement of FIG. 11 (or at least an additional portion thereof) is scanned and stored as an image in the database 310 (FIG. 3) in addition to the information extracted and used as an event annotation as set forth above. This approach has the advantage that additional information in the document (such as the bride's name, for example) is accessible and can be made available, if necessary, even if it is not expected to be needed at the time the key data items are extracted.

An exemplary output calendar based on information derived from FIGS. 7–11 is set forth below. As discussed above, the format of this calendar is described by an output specification 422 (FIG. 4), and can be changed dependent on the user's preferences and on the desired level of detail.

| FAMILY CALENDAR | |
|---|---|
| September 1997 | |
| 6 | [8:30 a.m.] Game Schedule - team B606 |
| | (EL Carmelo Elementary School) |
| 14 | MiDor L'Dor KICK OFF PICNIC |
| | (12 noon–2 pm, with Shorashim, at Mitchell Park) |
| 20 | MiDor L'Dor Begins |
| October 1997 | |
| 18 | Rob Rudy, Snack Schedule |
| November 1997 | |
| 9 | [1:30 p.m.] Marriage |
| | Doctor Richard Roderick Burton |
| | Saint Andrew's Episcopal Church |
| December 1997 | |
| 21 | MiDor L'Dor CHANUKAH BRUNCH |
| | (10 am–12 noon, with Shorashim) |

Note that some of the entries, such as the October 18 entry ("Rob Rudy, Snack Schedule"), are annotated with all available information. That is, all information extracted from the source document is available in this output calendar. However, in an alternative embodiment of the invention, the entire source document is digitized and stored in the database 310, and is hence available for viewing, for example by selecting a hyperlink associated with the entry in a digital form of the output calendar. In contrast, some of the entries, such as the November 9 entry ("Marriage"), have only some of the scanned information visible. In the November 9 entry, for example, the address of the church is omitted. Again, in a digital form of the output calendar, the additional annotations (or even a view of the entire input announcement) may be made available to the user via selectable options. Note further that some of the events (i.e., the events September 6 and November 9) have an associated time. The time is set forth in the manner defined by the output specification 422 (FIG. 4); some output calendars may omit this information, if desired.

Referring now to FIG. 12, a different exemplary output calendar 1210 is presented in grid format; this format is also specified by an output specification 422 (FIG. 4). The calendar 1210 is of a type that might be displayed on a terminal 110 (FIG. 1); it is contemplated that hardcopy calendars, like the one set forth above, would contain more information. In particular, the calendar 1210 represents a sample monthly calendar for a family that includes at least three family members: John, Henry, and Sylvia. A dental appointment 1212 for John is shown on Dec. 21, 1998. The display shows John's name, the event title, "Dentist Appointment," as well as the time for the appointment, "9:30 a.m." The date, however, is illustrated by the placement of the appointment 1212 on the calendar 1210.

Similarly, a meeting 1214 for Henry is shown on December 11; it has a start time (1:00 p.m.) and an end time (4:00 p.m.). On December 9, two appointments are shown, a first appointment 1216 for Sylvia and a second appointment 1218 for John. Because of limited space, the symbols ">>>" indicate that more information is available; the additional information may include information on the event title, the time, etc. Because the calendar 1210 is contemplated to be displayed electronically, the user is able to select either appointment 1216 or 1218 to view the additional information. In a hardcopy version of the same calendar, the additional data should be made available.

Streaming Media

The invention also includes a technique for analyzing a streaming data document, such as a voice recording, based on its recognizable genre structure, for example to change the document's form to better match its typical use. Although this aspect of the invention is applicable to numerous types of audio recordings, the application set forth in detail below relates to answering machine or voice mail messages; the document structure is such that certain information in the messages, e.g., names and phone numbers, can be determined. The invention allows key information to be summarized, extracted, skipped to, or restructured so it is more useful to the recipient.

Accordingly, the technique presented herein can be used as a complement to other speech recognition techniques. For example, it can be used to either skip through a long audio stream to the phone number, or it can be used to re-order a message such that the greeting and phone number are at the front of the message, and the message body and closing follow. If used in combination with existing telephone number extraction techniques, it can be applied to messages that have been understood or transcribed, both as a "sanity check" on certain key portions of the message and to bolster the overall accuracy of recognition. More particularly, one could use the inventive technique to localize key information in the document and then apply more sophisticated or time-consuming signal processing to that portion of the document.

Two aspects of the relevant medium (i.e., streaming data) are important to observe. First, the medium is linear, and can only provide substantially sequential access. The inventive technique has the advantage of keeping access to the extracted portion of the message in the same medium in which the message was received (rather than, say, transcribing the message for random access). The phone number (or other predictable, genre-specific, information) can also be preserved in the caller's own voice, an aspect of the audio stream that provides the recipient with significant non-transcribable information. Furthermore, the genre structure makes it easy for the caller to interact with the device (this is evident in the ubiquity of basic message structure—it is easy to remember a time when phone messages varied quite a bit more), but this same structure makes it inconvenient for the recipient's use beyond the first listening. For example, long phone messages are frequently kept around just to preserve the phone numbers they contain (which are short and often located at the end of the message). Of course, the document structure is only partly determined by the genre: it is largely free-form. No preset or exact form is required by this aspect of the invention.

Figure 13:
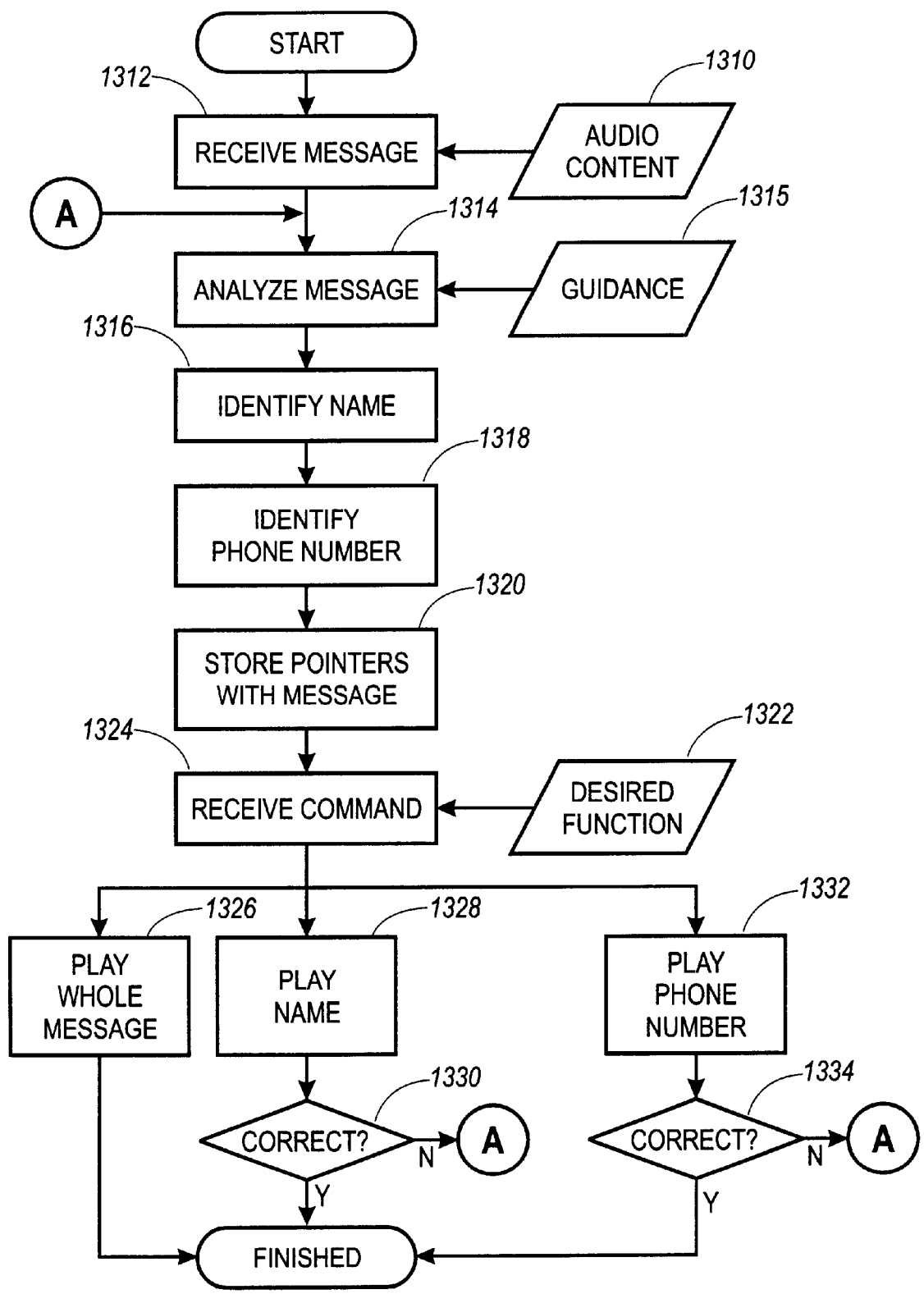
FIG. 13 is a flow chart illustrating the steps performed in an exemplary telephone message processing system according to the invention.

Accordingly, a system according to the invention for processing streaming media data, such as audio messages, is set forth as a flow chart in FIG. 13. Initially, audio content 1310 (typically a digitized data stream in any known format, such as pulse code modulation) is received (step 1312) by the system. As shown in FIGS. 1 and 2, this audio content can be received from a telephone device, a recording in a telephone answering device, a dedicated memorandum recorder, or from other sources.

The audio message is then analyzed (step 1314) to identify its constituent parts. This can be performed in real time (e.g., as the message is being received), or after the message has been stored. In one embodiment of the invention, voice recognition is performed on the message to isolate and identify all spoken words. Techniques for accomplishing this, including methods employing Hidden Markov Models, are well known in the art. The model used for voice recognition may be a general-purpose recognition model with a large vocabulary, or preferably may simply be able to identify a limited vocabulary of numerals and "cue words" (such as "at," "is," "am," "name," "number," etc.). Alternatively, the analysis step (step 1314) simply identifies the pauses and some distinctive cue words in the message; this can be accomplished via simpler and less computationally-intensive pattern recognition techniques.

In a preferred embodiment of the invention, the message analysis step is facilitated by guidance 1315. Recall that the input analysis step used in the calendaring system (FIG. 4) is guided by an input specification 414. Similarly, in the present application, guidance 1315 is provided in the form of a model or specification for typical voice messages. It should be noted that guidance 1315 is provided even when the message analysis step (step 1314) is fully automatic—guidance is inherent in the programming (including but not limited to an algorithm and voice model) that is able to recognize a vocabulary of spoken words, or in the preferred embodiment of the invention, pauses and cue words.

Following analysis, at least a name (step 1316) and a telephone number (step 1318) are identified. Obviously, some messages might not contain either item of information, but useful messages (from the standpoint of the invention) will contain both. Moreover, it should be recognized that information need not be solely derived from the audio message. For example, an audio message on an office voice-mail system may have a message header accessible as digital data, containing the speaker's name and telephone extension. Similar information, or at least a telephone number, can also be derived from "Caller ID" data provided by the telephone system.

The guidance 1315 is also useful in the identification steps (step 1316 and 1318), as it includes, in a preferred embodiment, models of the useful data expected to be found in a voice message, including information on the format (e.g., FIG. 18) and location (e.g., FIG. 14) of the data. The mechanics of the identification process, as well as some examples, will be described below.

After the name and phone number have been isolated, pointers to the data are stored with the audio message (step 1320). These pointers facilitate the ability to seek to desired portions of the message. For example, the need to call back an individual might not be apparent until a lengthy message has been entirely played. Using traditional voice mail systems, it can be inconvenient to go back and listen to the caller's name and number again, which may be somewhere in the middle of the message. However, when there are pointers to the caller's name and number, commands can be provided to allow the user random access to certain points within the message (e.g., the portions when the caller's name and number are spoken).

Accordingly, when the user desires a particular function 1322 (e.g., seek to the caller's name), a command is received by the system (step 1324). This command may be to play the entire message (step 1326), to play only the caller's name (step 1328), or to play only the caller's number (step 1332). It should be noted that voice recognition technologies (and the techniques presented herein) are not infallible, so facilities are provided (steps 1330 and 1334) to have the system re-analyze the message (e.g., by adjusting parameters, selecting an alternate choice, or accepting user input, as discussed above with reference to FIG. 4) if the wrong portion of the message was chosen.

If desired, the message and its pointers may be stored as part of the database 310 (FIG. 3); however, if full recognition has not been performed, it is likely that the system will not be able to index the information in any meaningful way without user intervention. Either the message as a whole, with pointers to interesting data, can be stored in the database, or only the name and number (for example, after the user has verified their correct extraction) can be selected for merger into the database. Accordingly, once extraction has taken place, the extracted number can be dealt with in at least three different ways: it may be saved as a full audio stream (much as pen computers save unrecognized handwriting) and remain a transient form annotating the particular message; it may be saved to the database (with all or part of the greeting to identify the caller); or it can be recognized as numbers, and merged into the appropriate organizing construct (such as a calendar or electronic address book). This technique can also be used as an accelerator—a key on the phone keypad may be used to skip directly to the embedded phone number in a long message. In this scheme, not only does the audio stream remain unchanged; it also remains in the same medium for access.

If the extracted number is to become part of the recipient's less transient information base, it may be appropriate to use audio cues in the voice mail structure to attempt to extract the caller's name. This process, again, may be automated, using heuristics that rely on the message genre and conventional structure ("Hi this is . . . returning your call", for example), as well as a phonetic list of known names (with their spelled-out equivalents).

Figure 14:
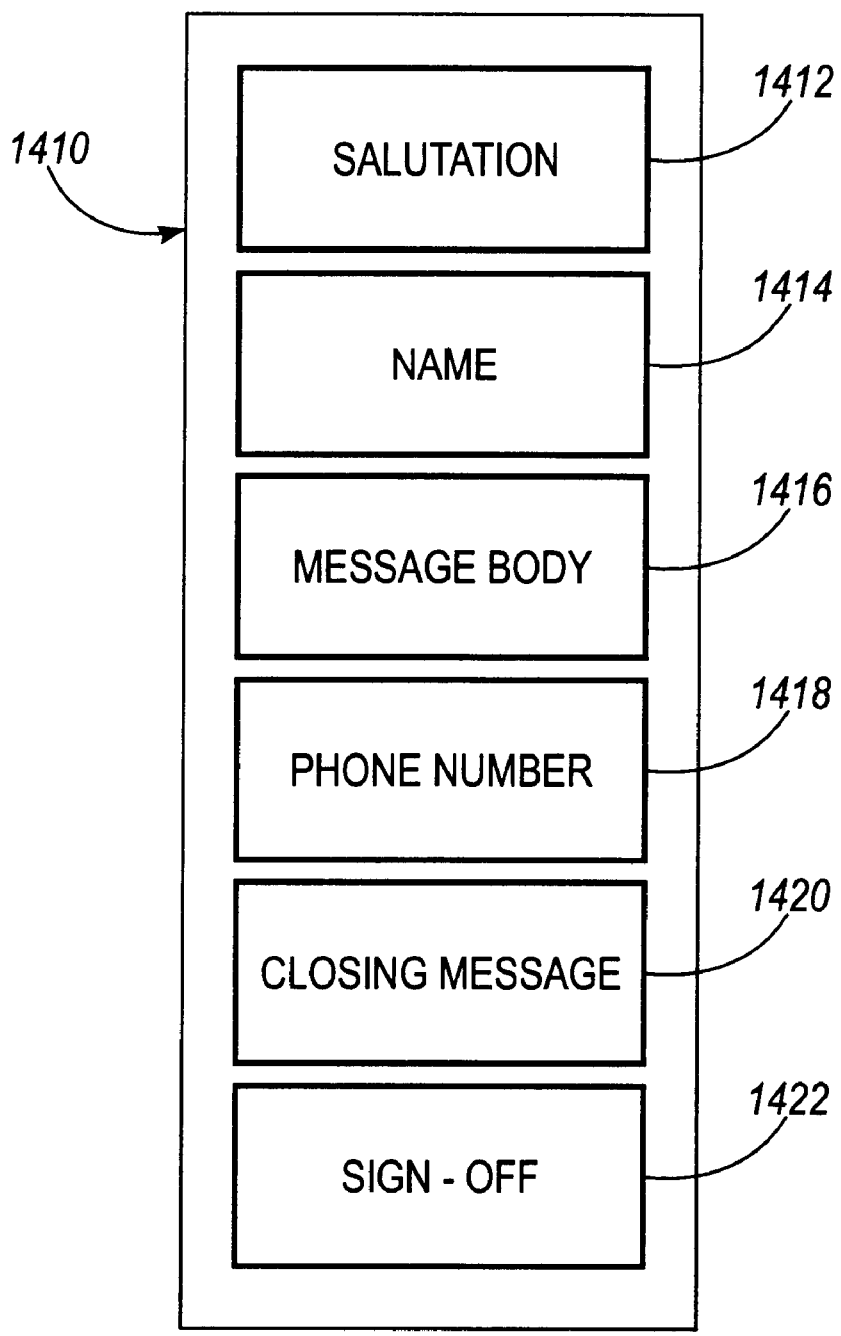
FIG. 14 is a diagram illustrating the typical structure of a telephone message.

It has been recognized that most telephone messages follow a semi-regular pattern; this pattern or model 1410, which facilitates the extraction of information, is illustrated in FIG. 14. Generally speaking, a telephone message typically includes a salutation or greeting 1412 (e.g. "Hello, I'm calling about the car for sale"); followed by the caller's name 1414 ("My name is John Smith"); a message body 1416 (e.g., "I'd like to know if you'd be willing to negotiate a lower price"); a phone number 1418 ("My number is 555-1212"); a closing message 1420 (such as, "please call me back if you want to make a deal"); and a sign-off 1422 (e.g., "Bye.").

Figure 15:
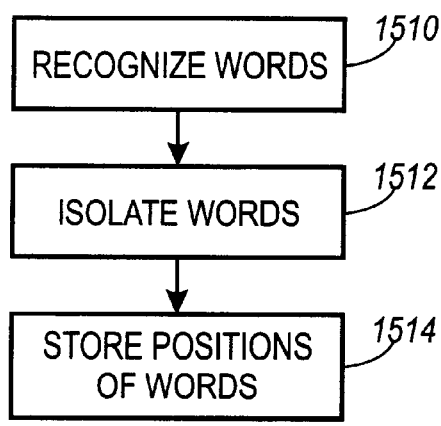
FIG. 15 is a flow chart representing the steps performed in an automated message analysis step as performed in the method set forth in FIG. 13.
Figure 16:
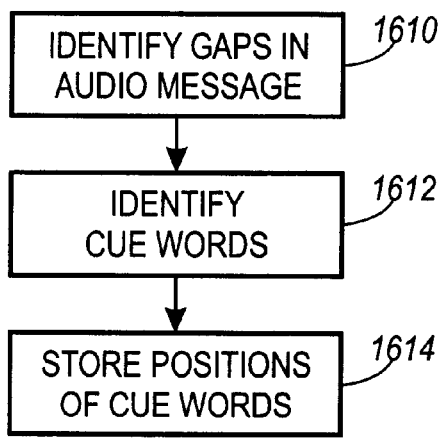
FIG. 16 is a flow chart representing the steps performed in a semi-automated message analysis step as performed in the method set forth in FIG. 13.
Figure 17:
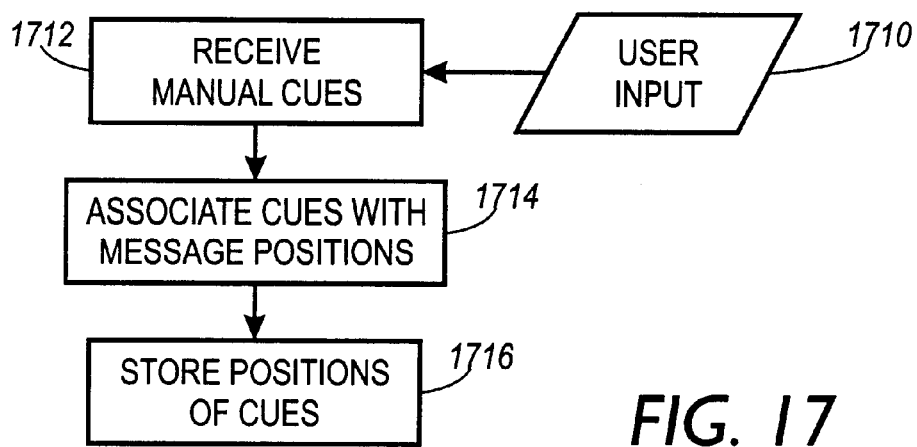
FIG. 17 is a flow chart representing the steps performed in a primarily manual message analysis step as performed in the method set forth in FIG. 13.

Like in the calendaring system described above, message analysis (step 1314) can take place automatically, semi-automatically, or mostly manually. In the automatic version (illustrated in FIG. 15), the words of the message are recognized (step 1510), isolated (step 1512), and stored (step 1514) as a transcription. Each transcribed word (which, in the case of a limited-vocabulary recognition model, might not be all of the words in the original message) is correlated with its position in the audio message. As stated above, a Hidden Markov Model voice recognition method can be used to accomplish this. In the semi-automatic version (FIG. 16), gaps or pauses within the message are identified (step 1610), cue words are identified (step 1612), and the positions of the cue words are stored (step 1614). Typically, names and phone numbers follow the cue words, so each candidate cue word can then be further considered to determine whether useful information follows. In the manual version (FIG. 17), user input 1710 is received (step 1712), indicating the positions of interesting data. For example, the user may press a "number" button when he hears a phone number being spoken, and a "name" button when he hears the caller's name being announced. These manually-generated cues are associated with positions in the message (step 1714), and stored (step 1716). It should be noted that the positions of manually generated cues may be automatically adjusted backward in time to the nearest silent pause of a particular duration, since a user might not recognize a phone number and press the "number" button, for example, until it is nearly complete.

Several detailed examples of message structure will now be considered. Several sample voice mail messages have been transcribed from an actual voice mailbox. In each of the messages, names have been changed and a few key words altered, but the sense of the message and its basic structure has been left intact.

EXAMPLE 1

From Leanne Goetz <recorded "from" information>

Sent October 29th at 9:39 am <automatic time stamp>

Hello Cathy this is Leanne Goetz. Cathy, could you give me a call please. I am trying to track down . . . I had a copy of your presentation yesterday and I was trying to fax it to finance. Unfortunately their fax was wrecked and they never actually received it and I made the mistake of giving that copy back to Arnold. So now I can't put my hands on it and it's likely that it might even be in his home office or in his pack that he is carrying. But I still need to get a copy of that to finance, Is that something that you could email to me or bring me a hardcopy? I'm at 5-5-2-5. Thanks Cathy. Bye-bye.

EXAMPLE 2
(Message with Interrupted Phone Number)

Sent October 30th at 10:30 am <automatic time stamp>

Hey Cathy, this is Mark Stott. I thought I'd call and see what the story was with you and the meeting next Tuesday and all of that. Um. We finally managed to get a copy of the agenda so we're actually sort of uhhh figuring out who's going to this. So I thought I'd—gee maybe Cathy's going—so I thought I'd call and check and see what the story was. Give me a call if you get a chance. 4-1-5—so I'm local—5-5-5-3-4-5-6. Talk to you soon. Bye.

EXAMPLE 3
(Message with Phone Number and Area Code)

Hi Cathy this is Chris Finch calling and I'm responding to our emails that have been crossing and I'm calling because my email umm at my San Francisco State address has been locked up and I'm uh just trying to get it unlocked but in the meantime I just wanted to see if we could possibly set something up. Ummm. I am actually free tomorrow which I know is very short notice and I'm not even taking that seriously but I just thought I'd throw it out there. Ummm. Not next week but the following week. Umm. So I was hoping that ummm we can get something going. I would love to come down and meet with you. So if you could give me a call back at 4-1-5-5-5-5-0-3-6-9 that would be terrific and I'll look forward to hearing from you. Thanks so much. Buh-bye.

EXAMPLE 4
(Message with an Ambiguous Signal, Namely "at" Followed by a Number)

Sent Friday at 9:56 am <automatic time stamp>

Hi Cathy it's Jennifer Stott um I'm just calling about Denise's surprise party. It's tomorrow and I know you had mentioned that you were possibly interested in contributing to one of the big gifts and I talked to Jim Swift this morning and he was gonna go out and pick something up sometime today. Umm. And I had mentioned to him that you might be interested in contributing to that gift. So if you have a chance and get this message ummm why don't you just give Jim a call. I don't have his phone number, but I know that he's also there at the lab so urn I'm sure you have that handy. Anyway if you have questions, just give me a call. Umm. Mark and I are home kind of off and on all day today at 5-5-5-0-8-6-4. Or I guess we'll see you at the party tomorrow at 4 o'clock. Bye-bye.

EXAMPLE 5
(Message Without Phone Number)

From Fred Thompson <recorded "from" information>

Sent Friday at 6:10 pm <automatic time stamp>

Hi Cathy this is Fred Thompson. I forgot to get back to you yesterday. Uhh . . . Both computers are all fixed up. Boards removed. Uhh. Reloaded with 4-1-3. Cuz the machine I believe the name is uh . . . does not have enough disk space to have any swap space. And . . . umm . . . If you have any questions, let me know on Monday. Thank you much.

EXAMPLE 6
(Conventional Internal Message—Note that it is "Well-formed")

Sent at 8:55 am <automatic time stamp>

Hi Cathy this is Alex Trebek. I just wanted to check with you on uh the shipment of the SPARCstation uh computer ummm and to see if that had gone out. I do need a copy of the shipper etc. Um. Give me a call. I'm at 3-8-4-5 and let me know what the status is. Thank you.

EXAMPLE 7
(Internal Message, Follows Form

Note that an extra number is unambiguously separated from the phone extension by a number of different cues. First, the year is spoken as two numbers, "19" and "96". Second, the signal "at" is used. Finally, the extension is at the end of the message, following our notion of well-formedness):

From Marian Branch <recorded "from" information>

Sent at 4:18 pm <automatic time stamp>

Cathy, this is Marian. Um I called because I'm looking for a book that was checked out to somebody who I believe was a summer student who was working with you—he gave your name—in 19-96. Um. Flavio Azevedo and the name of the book is "Doing with images makes symbols" by Alan Kay. Um. We are anxious to get it back and of course I suspect the worst. Anyway. I'm at 5-9-0-8. Talk to you later. Thanks. Bye.

EXAMPLE 8

Phone number is repeated and is introduced with an "is". Second phone number is included in the message, preceded by "number". Structure is a little different due to long closing):

Sent yesterday at 5:45 pm <automatic time stamp>

Hi Cath it's Cynthia it's about um 5:45 and I actually came to the Creekside. Um. I tried you earlier and you weren't there and besides I kind of wanted to check in. So anyway I'm at the Creekside which is 5-5-5-2-4-1-1. 5-5-5-2-4-1-1. I'm in room 1-15. Um. I'm going out to and get my bags. And I'm also going to check my um other number 7-8-9-0 to see if you left a message there by chance. Then I thought I actually would head toward Stacey's it occurred to me that if you wanted to go to downtown Palo Alto I could just pick you up at PARC on my way. We could go and I could take you back to your bike later. Um. Or we could do whatever you want to. Ummm. Anyway hope things are okay. And I will check my number and I'll be here for a little while and probably leave you more messages. Bye-bye.

By examining these messages, we can identify the following features: First, the messages follow a general form, as discussed above. Second, messages may lack any part of the general form, but usually are recognizable instances of the genre. Third, phone numbers embedded in the messages are close to the end and seldom contain noises like "umm" or "uhh". They are usually strings of numbers, spoken quickly, sometimes with internal pauses. Many are of a known length. In three of the example messages, the phone numbers are signaled by "at". A relatively small number of other cues may also be used, such as "that's" or "number." Fourth, the messages may contain other unambiguous clues about the kind of phone number found within: for example, the messages may contain a structured header which enables you to distinguish between internal and external messages. Finally, if the messages contain structured headers, the headers will remove some common types of numerical information from body (i.e. time and date). If they do not, the time and date are probably in the greeting, rather than after the body.

Some of the complications we can observe from these examples include: messages which contain no phone number (e.g., example 5); phone numbers which are corrected or self-interrupted ("4-1-5—so I'm local—5-5-5-0-8-6-4"); and messages containing other numerical information ("Reloaded with 4-1-3"). Moreover, some phone numbers are of unpredictable length (some extensions are two to five digits long, and some international calls may come in).

Figure 18:
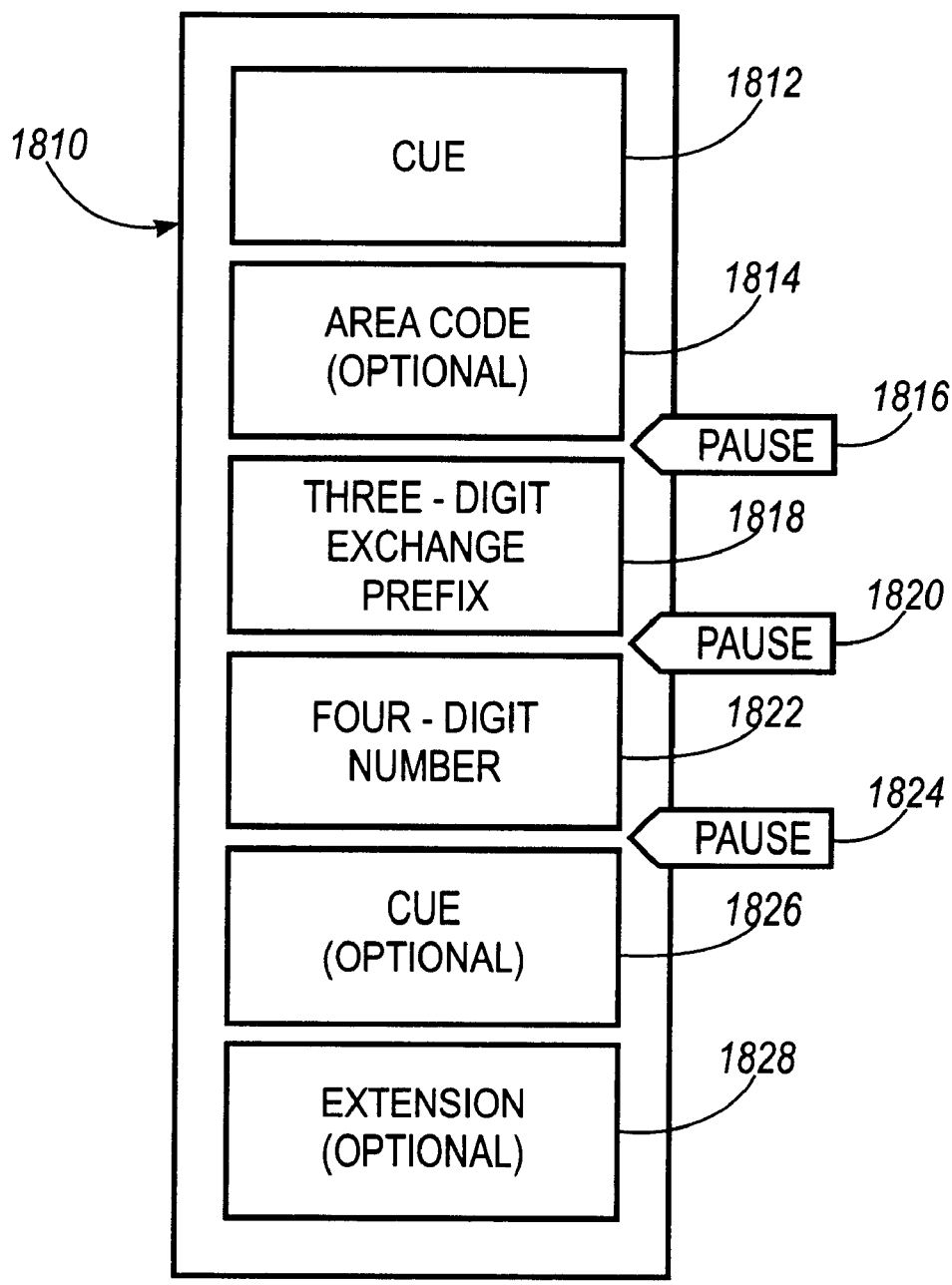
FIG. 18 is a diagram illustrating the typical structure of a spoken telephone number.

However, in general, a well-formed telephone number 1810 often has the following characteristics, as illustrated in the model of FIG. 18. The well-formed telephone number 1810 typically begins with a cue 1812, such as "I'm at," "my number is," or simply "at" or "is." Following the cue, the U.S. area code 1814 is presented, if necessary. Then, frequently there is a pause 1816, followed by the three-digit exchange prefix 1818, another pause 1820, and the remaining four digits 1822 of a seven-digit telephone number. Then, when there is a phone extension, another pause 1824 is frequently present, followed by another cue 1826 (such as "extension" or "room number") and the extension 1828.

These characteristics, alone and in combination, assist the system in identifying spoken telephone numbers, particularly those that follow traditional conventions.

Generalized Genre Processing

A document, whether in physical or digital form, has a genre, which exists only within and relative to a social context. The notion of genre can be generalized, and in so doing, powerful new computational systems can be created.

Consider, for example, a collection of pre-existing input documents that includes documents from a plurality of different genres and potentially from a variety of different media. Each document in the collection includes various pieces of information. Furthermore, some coherent subset of these pieces of information, distributed across the various genres, may form a consistent and coherent genre on its own, which can be synthesized and merged into a new document. This new document is of use to a particular user (or groups of users) for a particular purpose, typically at a particular time. The ways in which the pieces are combined can be a function of the reader(s), purpose, and time. Moreover, this new document has its own genre, and the way in which the pieces of information are combined into the new document depends on that genre.

This generalization and new conceptualization allows the consideration of a database system. Such a database system would facilitate the automated or semi-automated recognition of the appropriate pieces of significant information in input documents, extract these pieces from the documents, and merge or synthesize them into a unified computational representation or database. The computational representation can then be used to generate (re-present) an output in human-readable form (e.g., a digital display or physical printout) of a new document. The genre of the new document is the same whether that document is expressed in its (intermediate) computational representation or its (final) human-readable representation. Both of these are localized representations, in that all the significant information pieces have been conveniently gathered into one place, either digital or physical.

In addition to input and output document genres, it is possible to consider the genre of the as-yet-unformed new document, even before the relevant pieces are extracted from the input documents and merged into a unified computational representation. This inchoate form of the new document neither is nor has the same genre as the output genre. Rather, it is preferable to say that this is a different kind of document genre, one that does not exist except across a plurality of other documents in other, more conventional, socially persistent genres (and typically, though not always, in multiple media). This new kind of document genre, a genre created across a distributed set of input genres, will be called a "distributed" genre ("implicit" and "synthetic" genres are also fairly accurate descriptive terms).

It should be noted that at least one characteristic distinguishes a distributed-genre document from the raw materials that constitute its inputs. The inchoate form of the new output document includes not only some set of identified pieces of information still resident in multiple input documents, but also a "glue" that holds them together so that together, they provide a distributed representation of a new document (that can later be transformed into a localized representation). The "glue" consists of two main components, namely, social context and computation.

A social context is defined by the intended reader(s), audience, or users of the output document, the purpose(s) for which it is being constructed, and the time at which it is being constructed. Additionally, social context is provided by the socially-constructed input and output document genres, which shape the intermediate distributed document genre, much as the dimensions of an input space and an output space affect the character of a matrix or tensor that transforms between the two spaces.

The social context, in turn, provides significant computational constraints. In particular, the human reader can provide hints, directives, and other guidance to the computational system of the invention. This information reflects the human's social context. Furthermore, the computational system includes models, heuristic algorithms, and/or other programming concerning input and output document genres and the relationships that allow information from certain input genres to be re-used in certain output genres. Taken together, the human-provided guidance, specific to the task at hand, and the largely pre-programmed description of genres, can provide an effective way to turn the user's understanding of social context into something that the system can process. This process is discussed in further detail below.

A distributed genre document therefore includes several things beyond the "raw material" of the identified portions in the input documents. It also includes: a specification of input genres, output genres, and a mapping of information between these; a further explication of social context, specific to the user and task at hand; and a computational engine, suitably programmed, that has the capacity to represent all of the above. Only with all these things, taken together, does the distributed genre document emerge. In sum, the notion of distributed genre arises when a distributed collection of information derived from multiple diverse source documents is bound together in a meaningful way through computations representing social context.

As a first example of a distributed-genre document, consider the calendar examples set forth above as FIGS. 7–12. Suppose that the computational system, preferably operating with some interactive human guidance, takes as its input a collection of documents found in a household with school-age children, such as:

A child's sports league calendar;

A social event announcement from church or synagogue;

A parent-teacher event announced in a memo brought home rom school;

An advertisement for a performance by a local musical or theatrical group;

A wedding invitation;

An email announcement of an upcoming talk;

A voicemail invitation to a party; and

An annotated printout of an earlier version of the user's calendar.

Each of these input documents comes from its own distinct genre; however, when the distributed genre formed by the calendar information found in each document is considered, a distributed genre is defined. The ultimate goal when analyzing this particular distributed genre might be to produce an integrated, up-to-date, full-month calendar incorporating all and only the events that household members plan to attend (see, e.g., FIG. 12).

The collection of source documents is transformed from a jumble of raw source materials into a coherent, distributed-representation output document having a distributed genre via the interconnection provided by social context and by the human or computerized processing taking place in that social context. The social context is established by the particular group of readers in this household and by the purposes for which and timing with which they will use their new calendar, as well as by the (socially and culturally defined) genres of the input and output documents. The computation here takes advantage of and is facilitated—even enabled—by this social context. The computational system recognizes which portions of the input document are significant and how they fit together to make up the output document by taking into account:

Characteristics of both the input and output document genres;

Hints, directives, and other guidance received from the intended users of the calendar; and Time and other circumstances surrounding the computation itself, notably including the date and perhaps other state variables, such as the geographic location or the content of the system's most recent calendar-type outputs.

The intermediate distributed genre arises during the process of identifying dates and other useful information from the input documents. Soon thereafter, the computational system begins to form a localized, more unified output document, whose genre is the output genre specified by the user.

As a second example of a distributed genre approach, consider the problem faced by a busy worker who needs to send a change-of-address email message to a large number of recipients. The message body text is simple enough to write. The harder work, however, is to track down all the recipients' names and email addresses. A "personal address book" from the worker's email program is likely to be incomplete, so it can only serve as a starting point. Other email addresses to be added to the address list come from other genres. For example:

An after-work networking opportunity yesterday evening has produced a fresh stack of business cards on the worker's desk, which may be scanned with a business card-scanner.

Some of the business cards include Web site addresses. The worker browses the Web sites, follows a few links, and discovers more addresses worth including in the letter, like the one on the Web page belonging to a long-lost college classmate who's now a distinguished professor.

A printed announcement received in this morning's mail brings news of an old acquaintance whose firm has merged with another firm, resulting in a new email address. The printed announcement is too large for the business-card scanner and is of the wrong document genre besides. It will need to be scanned separately on a flatbed scanner or digital copier.

A colleague calls the worker from a cellular phone. As it turns out, the colleague is the passenger in a car whose driver has been meaning for some time to extend a dinner invitation to the worker. The colleague relays the driver's invitation, together with his email address, verbally to the worker, who transcribes the email address longhand on an ordinary piece of paper.

A good many addresses of interest come from previously received email messages. Extracting the addresses is not as easy as one might suppose. While many of the addresses can be detected simply by examining the "From" header field of the messages, others cannot. Indeed, useful addresses can and do appear anywhere in an email message, including the main text, all headers, and signature lines. Furthermore, address formats may be inconsistent. For example, one system may format its email addresses with the human-readable name preceding the Internet name, the latter being enclosed in angle brackets. Another system may leave this information out, showing only the Internet name.

The challenge for the computational system is to produce, from these disparate inputs, a single output document (namely, the worker's change-of-address message) that has all and only the desired addresses, preferably in a single, consistent format, placed in the "To" header field of the outgoing message. Duplicate addresses should be eliminated, and no one inadvertently left out.

Once again, this scenario can be understood in terms of distributed genre. The combined collection of electronic address book(s), digitally scanned business cards, old email messages and so forth is a collection of input documents in various genres and original media. Each contains one or more pieces of information to be recognized and extracted and merged by the system into an output document of specified genre for a particular user and purpose. The computational system reviews the various input documents together with the specification of the desired output genre and a set of hints or guidelines from the user, and identifies the relevant pieces of information from the input documents (as discussed in detail below). Again, as in the first example, the system also looks to the characteristics of the input genres and the relationships between these genres and the specified output genre to facilitate its task. A distributed-genre intermediate document is established across the input documents as the system begins to put together the output document (or, alternatively, as part and parcel of the construction of the output document). Eventually, the system constructs a unified computational representation of the new document, from which the output document can, in turn, be generated.

Figure 19:
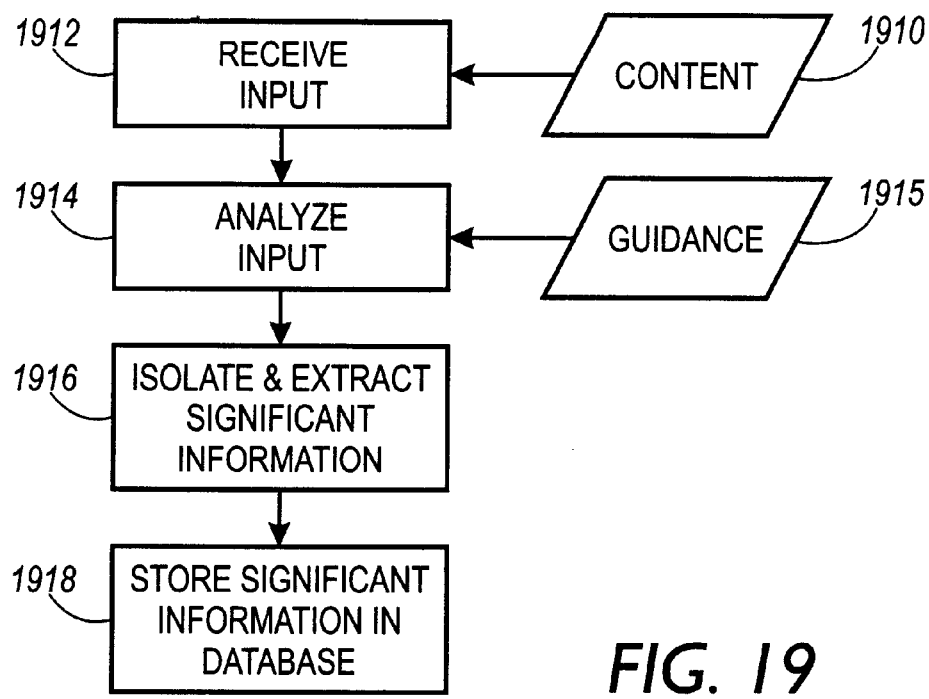
FIG. 19 is a flow chart illustrating the input steps performed in an exemplary distributed genre document processing system according to the invention.

The method of receiving and processing documents in various input genres is set forth in FIG. 19.

First, a collection of input documents (or any type of content 1910 at all) is input into and received by the system (step 1912). The input is then analyzed (step 1914), either automatically or semi-automatically (with user input) to identify the document's genre, thereby determining what information in the document may be significant. Exemplary automatic and semi-automatic methods for extracting information such as dates, times, addresses, and telephone numbers are discussed above. As above with the calendaring and streaming media embodiments above, guidance 1915 is provided in the form of a set of models or specifications for all expected types of input documents. These models, templates, or specifications can be pre-coded, or alternatively, can be trained (e.g., with a Hidden Markov Model) on the basis of repeated user input choices. Again, it should be noted that the guidance 1915 is provided even when the input analysis step (step 1914) is fully automatic; the requisite user input may have been provided earlier and used to shape genre models, or may be essentially hard-coded into the system. Moreover, in either case, the guidance 1915 represents the social context of the input documents.

The significant information in the input documents is recognized in a manner consistent with the notion of the intermediate, distributed genre document as has been described. In particular, the genres of the input documents are considered, and stored information (e.g., models, heuristics, statistics, etc.) about their respective characteristics and their relations to the specified output genre are employed to help direct the analysis. In addition, the nature of the output genre, user- or task-specific guidance, and various other factors may also be considered, such as the current time, date, and other state variables. There may be further interaction with the user at this stage; the analysis process may require more information if the problem to be solved is insufficiently constrained.

The significant information is then isolated and extracted (step 1916), and stored in (or "merged into") a database (step 1918). For a typical distributed genre document (or database), the "significant information" is all discernable information in a source document; any and all information might be used in an output document of unknown genre.

Figure 20:
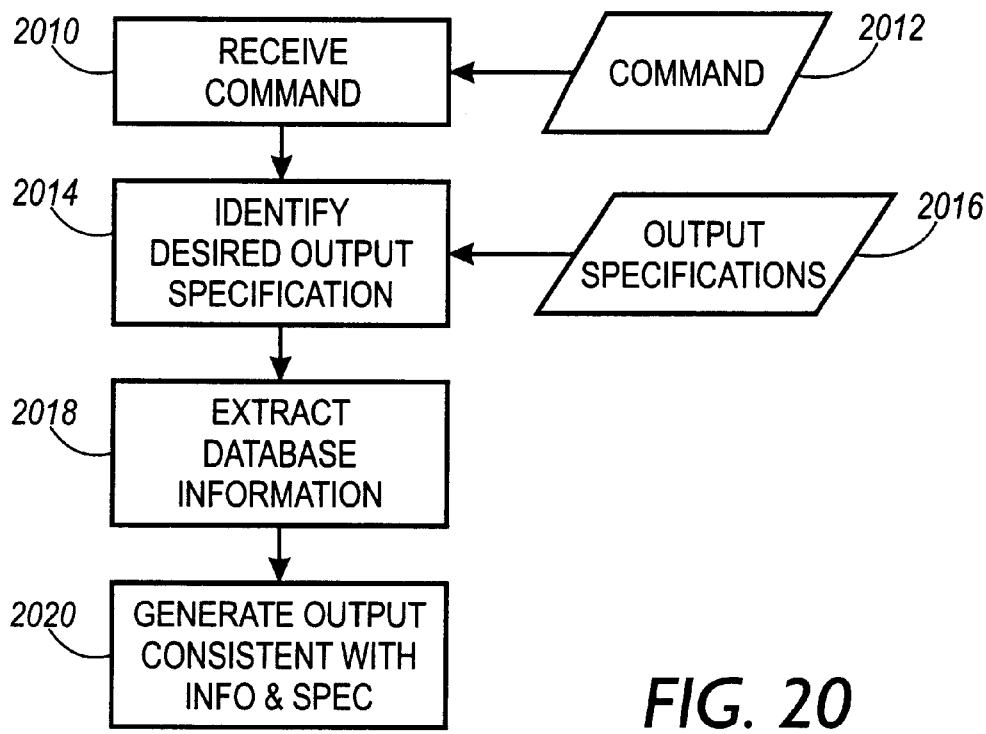
FIG. 20 is a flow chart illustrating the output steps performed in an exemplary distributed genre document processing system according to the invention.

The generation of output is illustrated in connection with the flow chart of FIG. 20. Typically, though not necessarily, the generation of output involves re-presenting the unified computational representation (in the database) to the user as a human-readable document, either physical or digital, in a specified output genre. Typically, there is just one output document, drawn from a potentially large number of input documents. However, in an alternative use of the invention, there could be more than one output. For example, it might be beneficial to generate, for example, a set of related calendar printouts, one for each person in a group, each one slightly different according to the individual recipient.

The process begins by receiving (step 2010) a command 2012 indicating a request for an output document. This command 2012 identifies a particular desired output genre specification (step 2014) selected from a group of possible genre specifications 2016. The information from the database required to construct the output document is extracted (step 2018), and a document consistent with the selected genre specification is generated (step 2020) and presented to the user.

It should be observed that, while all (or nearly all) of the significant information from all of the source documents exists in the database, not all of the information will be useful in generating a particular output document. For example, where the database includes information derived from a number of calendars, e-mail messages, and business cards, among other things, and the user wishes to prepare a monthly calendar, most of the data derived from business cards will not be useful. Similarly, for the change-of-address notice described above, most of the calendar information will not be useful, unless the source calendars also contain individuals' names and contact information. Stated another way, the database exists across all genres, while a particular set of inputs or outputs may represent only a single genre or group of genres.

Various data characteristics are useful in assisting the derivation and extraction of useful information from documents of any genre; this is described above with regard to telephone numbers (see FIG. 18). In other words, certain characteristics of useful data types facilitate their identification within documents.

Figure 21:
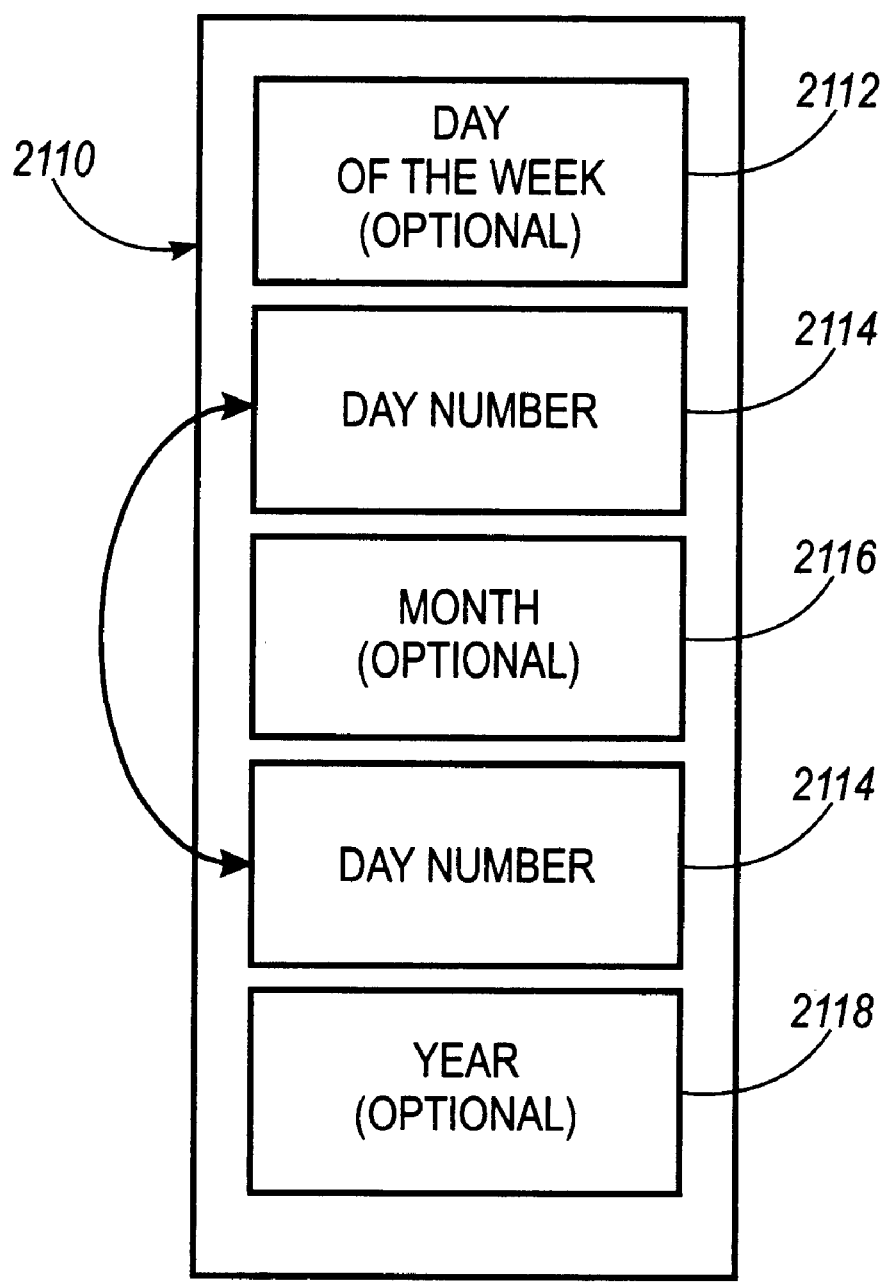
FIG. 21 is a diagram illustrating the typical structure of a spoken or written date.

Referring now to FIG. 21, the structure of a typical date 2110 is shown. A date, whether written or spoken, commonly begins with the day of the week 2112 (i.e., Sunday through Saturday). However, this is often omitted. Then, one of two conventions is used: either a day 2114 followed by a month (or its abbreviation or numeric equivalent) 2116, or a month 2116 followed by a day 2114. Examples of the former include "the seventeenth of December," "17 December," or the European-style "17.12," to name a few. Examples of the latter include "December 17," "December 17," and the U.S.-style "12/17." Care should be exercised to distinguish U.S.-style numeric dates from European-style numeric dates; the document's genre will provide guidance in this area.

Figure 22:
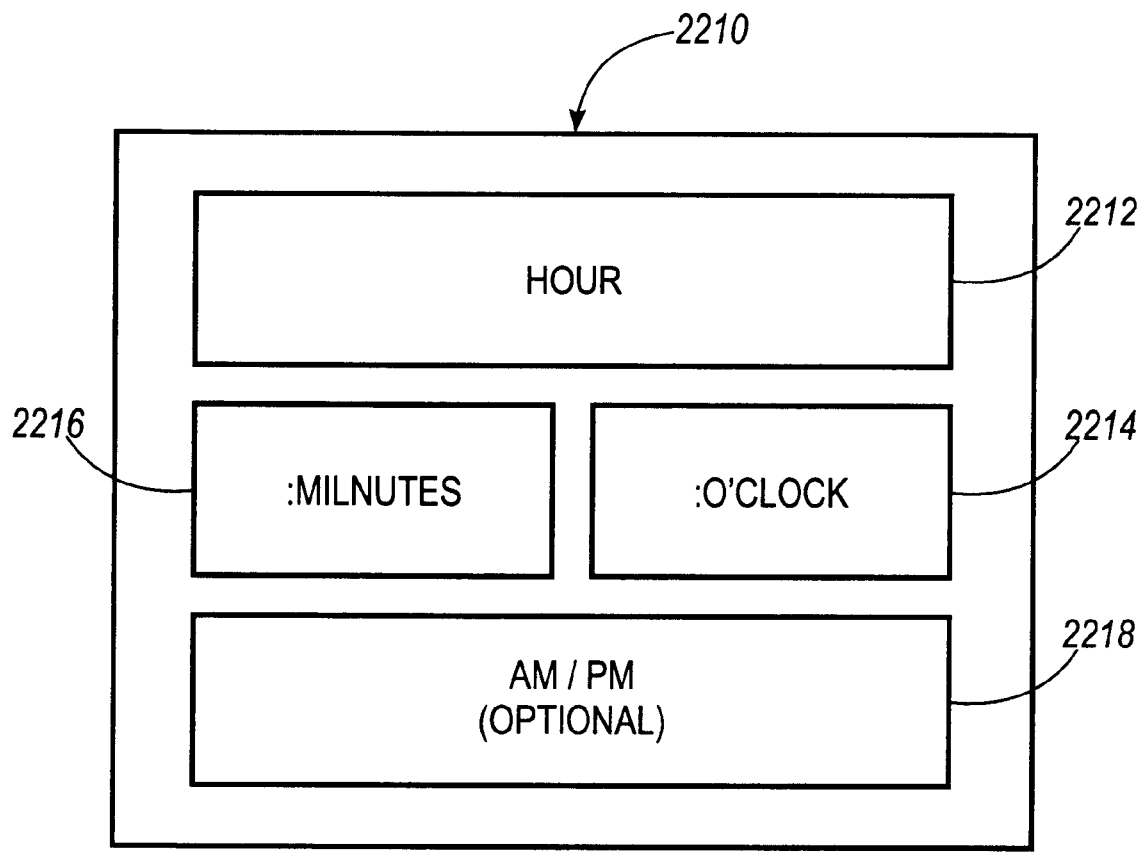
FIG. 22 is a diagram illustrating the typical structure of a spoken or written time of day.

FIG. 22 illustrates a typical written or spoken time 2210. An hour 2212 (1 through 12 in civilian time; 0 through 23 in military time) is followed by either an optional colon (:) and a number specifying minutes 2216, or the phrase "o'clock." 2214. In civilian time, either "AM" or "PM" 2218 usually follows, unless the time is unambiguous for other reasons (e.g., it would obviously occur during the business day).

Figure 23:
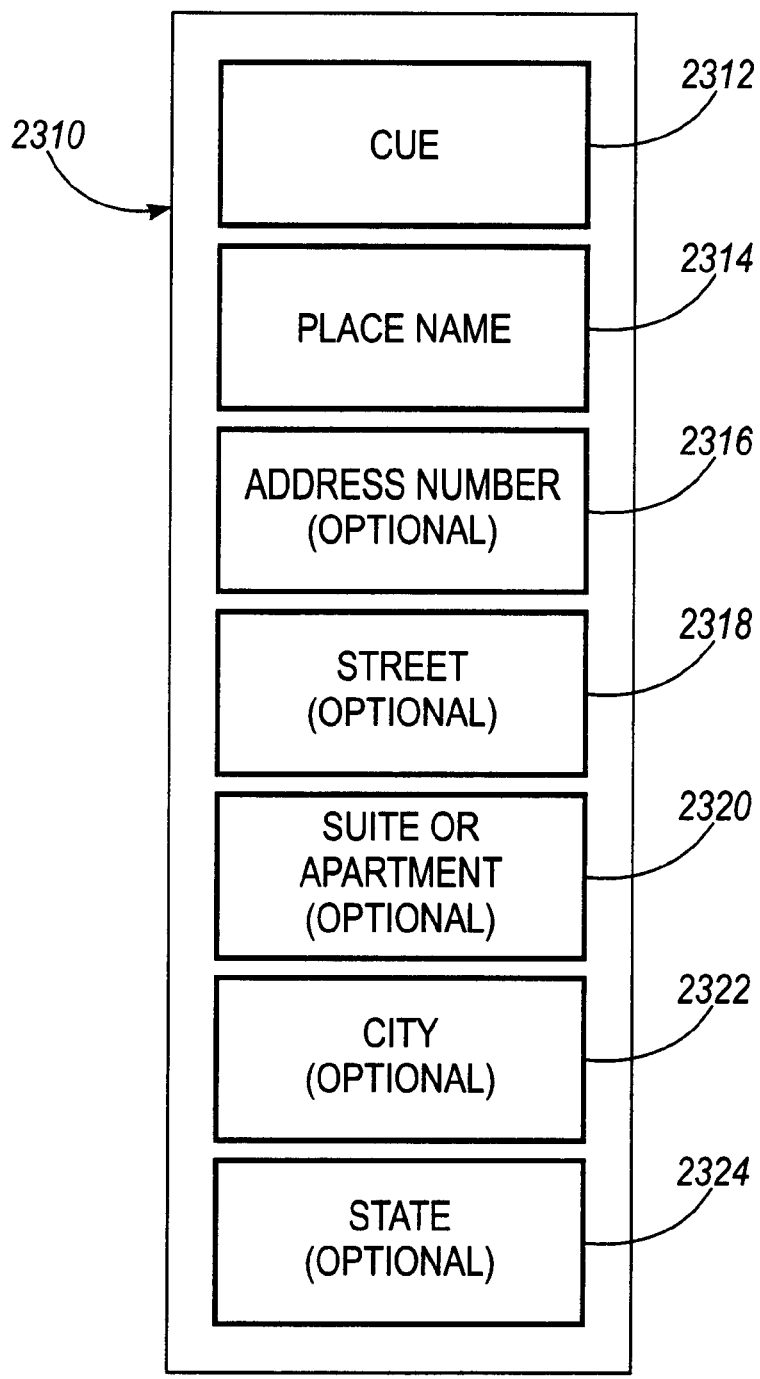
FIG. 23 is a diagram illustrating the typical structure of a location or address.

FIG. 23 shows a typical location 2310; this format is followed by the wedding invitation of FIG. 11. A cue 2312, such as "at," is followed by a place name 2314 (e.g., "Saint Andrew's Episcopal Church"), an optional address number 2316 (e.g., "13601"), a street name 2318 (e.g., "Saratoga Avenue"), an optional suite or apartment 2320 (not applicable in FIG. 11), an optional city 2322 (e.g., "Saratoga"), and an optional state 2324 ("California").

User Assistance

Most previous work on genre analysis has focused on the fully automated extraction of document content. It is also useful to consider a different focus, namely human-guided identification and interaction with genre. As discussed above in connection with FIGS. 4–6, user guidance is an important (and, at least in some cases, probably essential) part of the "glue" that turns raw input documents into a distributed genre document, as the form of distributed information can often be insufficient to guarantee its relevance. For example, there are dates of little concern embedded in the documents that describe calendar-related events. In the alternative example set forth above, when collecting e-mail addresses for a change-of-address notice, there may be inappropriate email addresses mixed with the desirable ones (as opposed to addresses that are simply redundant or out-of-date). Thus, even if one were able to model all of the diverse forms that might occur, they would not capture the full context of use; human guidance would still be necessary.

By allowing human guidance, the power and accuracy of the extraction can be increased. Furthermore, the possible input domain for a system according to the invention can also be greatly enhanced. Users today live in a world in which their information changes constantly; it can become out-of-date very rapidly. Moreover, users cannot control, and sometimes cannot even predict, the form or forms in which new information will arrive. In contrast with traditional relational databases, with their rigidly specified forms of input and carefully controlled data entry performed by dedicated workers, users of the present invention are generalists who live in a world of dynamic (and socially constructed) information that they must manage, but do not control.

Thus, in a presently preferred embodiment, the present invention does not attempt to automate the entire process of producing the distributed genre document. In particular, the user will often need to provide considerable guidance to the computer about what is most important in a given input document. At the same time, however, some automation is welcome, because the busy people who will use this technology at home and in the workplace often suffer from information overload. They want and deserve some labor-saving help. An automatic dishwasher still requires manual loading and unloading of the dishes, yet it can be a tremendous timesaver over hand washing. So, too, a semi-automated document analysis/synthesis system is worthwhile for the present invention.

Accordingly, we now consider, in detail, the types of guidance which would be appropriate for such a system, and in doing so describe a suite of techniques for facilitating and guiding the recognition, extraction, and merging tasks in semi-automated document analysis/synthesis systems that incorporate distributed genre approaches. Typically, the techniques involve marking up the input documents: a human makes marks by hand in a way that the computational system can process automatically with little or no further human intervention thereafter. The contemplated approaches include, but are not limited to:

Filtering. By choosing which documents are to be presented to the system, the user filters the universe of documents and hence bounds the problem space and exerts an initial rough control over the system. Further analysis can operate semi-automatically.

Before-and-after comparison. The user draws lines or circles, or makes other graphical marks, to indicate which parts of an input document are of particular interest, or even to indicate operations such as addition or deletion. For example, using the Formless Forms technology described above (U.S. Pat. No. 5,692,073, which is hereby incorporated by reference as though set forth in full herein), a paper calendar could be automatically synchronized with an online calendar. Suppose that the calendar is first printed on paper. Over time, the paper is annotated with cross-outs for deleted appointments, arrows for moved appointments, and handwriting for new appointments. The paper copy can then be re-scanned, and re-synchronized with the electronic version. In the most advanced case, annotations for a given day are extracted, analyzed (via handwriting recognition), and inserted into an electronic calendar, which can then be re-printed if desired. The simpler tasks of moving and deleting appointments do not require recognition, just mark extraction as described in the '073 patent.

Pen-based annotation. At least two different user-pen interaction techniques can guide the system. First, either by using different pens, or by using different modes of a single pen (e.g. a pen which can use multiple colors), uses can use different forms of ink (either physical or virtual) to distinguish different forms of information, similar to how a highlighter is traditionally for some types of information and pencil for others. Second, by using a scanning pen, users can directly indicate which portions of the document have information of interest. The temporal order in which the lines are scanned, and the context of annotations made by the pen between such scans, can further guide the system. An example of this mode of operation is described in detail above, with particular reference to FIGS. 7–11.

Modeling. As discussed above, various models of extractable document types can be prepared and used, with the appropriate model being chosen via pattern-based recognition. Generally speaking, models can either be of highly stylized document forms, or may specify genre structure.

As will be recognized, various other models of user interaction are also possible, including (as discussed above) iterated fully automatic attempts to extract information, followed by a user review step which either "rejects" the product, prompting another attempt, or implicitly accepts the product.

Smart Moded Scanning Pen

As described above, particularly with reference to FIGS. 7–11, a smart scanning pen may be used as an input device in conjunction with the invention. A block diagram illustrating the functional components of such a pen 2410 is set forth as FIG. 24. Such a device includes an on-board processor 2412, a data interface 2414 (such as an infrared or RF wireless link), an optical scanning head 2416, manually operable controls 2418 (such as at least one push-button), a visual feedback mechanism 2420 (such as an indicator light or display screen), optionally an audio or tactile feedback mechanism 2422, and on-board storage 2424. These functional components will be explained in further detail below.

Figure 25:
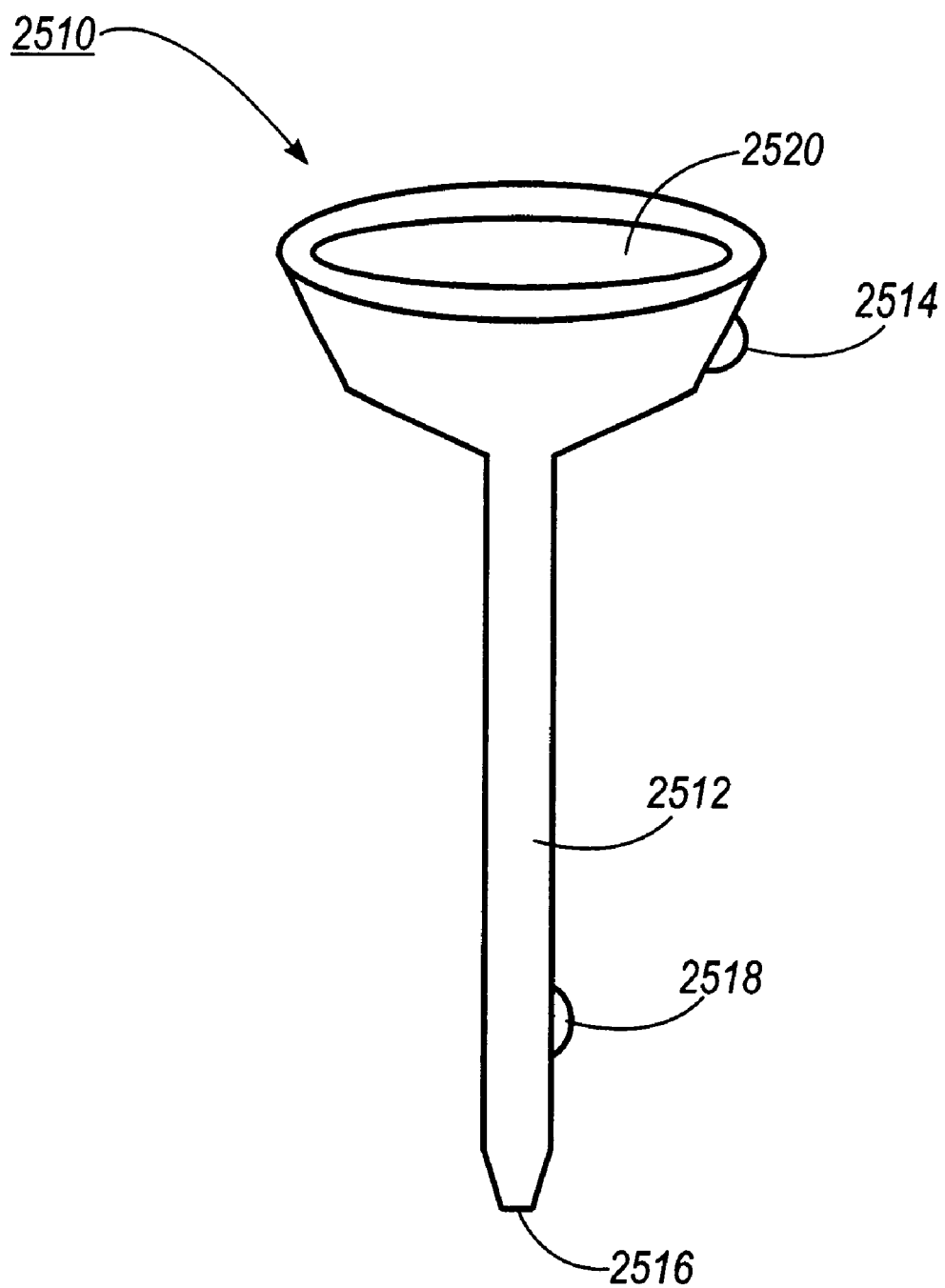
FIG. 25 is a visual representation of an exemplary moded scanning pen according to the invention having a first form factor.

One embodiment of the scanning pen is visually represented in FIG. 25. A pen 2510 includes a traditional pen-shaped body 2512, a bi-directional infrared transceiver 2514, a scanning head 2516, a push-button 2518, and a display screen 2520.

Figure 27:
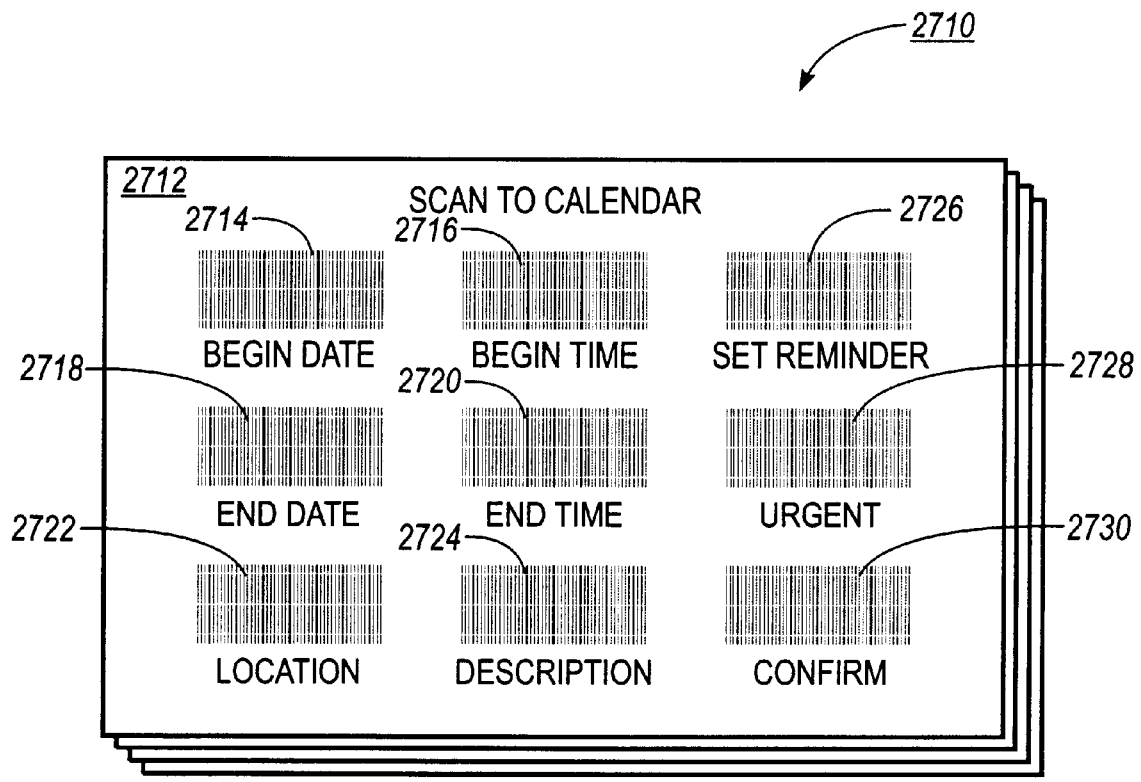
FIG. 27 is a visual representation of an exemplary mode book for use with a moded scanning pen according to the invention.

In a preferred embodiment of the pen 2510, the display screen 2520 is operable to confirm with the user at least two items of information: (a) recognized text under the scanning head 2516, and (b) the pen's current mode. As described above in conjunction with the calendaring system, a scanning pen can be used to extract multiple items of information from a printed calendar, including an event title, a date, and a time. Different events are indicated by pressing the button 2518. The scanning pen's mode comes into play as follows: after the button is pressed, the "resets" to expect a new batch of information. In a preferred embodiment of the invention, the various information items need not be scanned in any particular order, and can be identified by the system by virtue of the differing characteristics of the different data types. However, in a simplified embodiment, the pen may enforce a particular order to the fields to be entered (e.g., title first, then date, then time), and such requirements can be indicated on the display screen 2520. Moreover, the system may be expecting information from a different genre, such as a business card. A display of the pen's mode can be used to indicate to its user both the expected genre of the input and the particular data items to be input, either collectively or in sequence. In a preferred embodiment of the invention, manual mode changes can be brought about by scanning a digital code printed in a mode book (FIG. 27).

In one embodiment of the pen 2510, the screen 2520 is 1 to 2 inches in diameter. In this configuration, it is possible to read the screen as the pen 2510 is used to scan text on a printed page. The pen's mode is indicated by colored indicators, and scanned text is displayed on the screen as scrolling text. At the center of the screen is the current field of view; text already scanned appears to the left (or right, if a line is scanned from right to left).

There is a sufficient area underneath the screen 2520 to accommodate on-board logic to support operating the display screen 2520, and optional storage area to accumulate data before transmitting it to the database 310 (FIG. 3). In one embodiment of the invention, input is stored in the pen's storage 2424 until a command (such as holding down the button 2518) indicates that the data should be transmitted to the database 310. Alternatively, the command to transmit may be initiated by the database 310, rather than the user.

Figure 26:
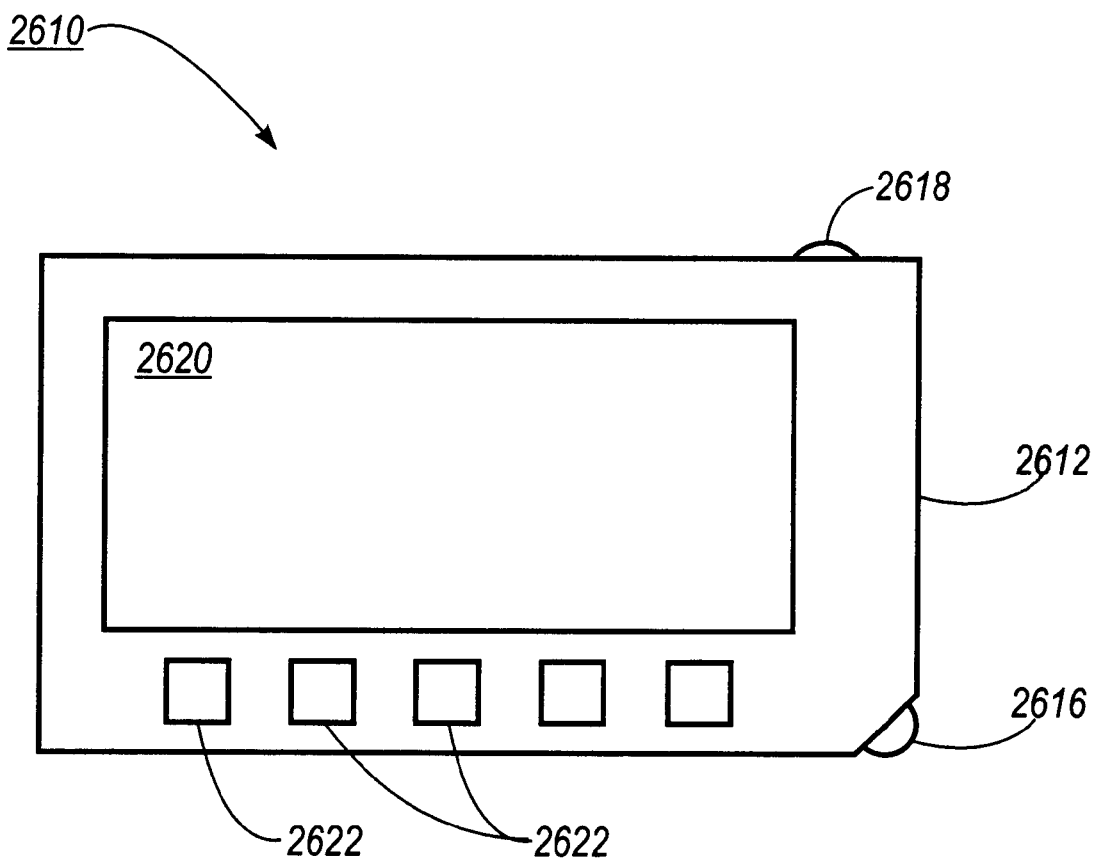
FIG. 26 is a visual representation of an exemplary moded scanning pen according to the invention having a second form factor.

A scanning pen 2610 with an alternative form factor is illustrated in FIG. 26. This version has a card-shaped body 2612 (preferably the size and shape of a credit card), a scanning head 2616 at one corner, and a button 2618 along its top edge. A display screen 2620 is situated on one side of the rectangular body; it is typically not visible while text is being scanned, but can be easily viewed when the pen 2610 is lifted from the paper. The pen also has multiple input buttons 2622, capable of facilitating mode changes or command entry.

A mode book 2710, usable to manually alter a scanning pen's mode, is illustrated in FIG. 27. The mode book 2710 includes a plurality of mode cards 2712, each of which contains at least one scannable data field operative to change the pen's mode or enter a command. Each scannable data field comprises machine-readable information (e.g., a bar code, a two-dimensional glyph code, or easily-recognizable text) and a human-readable label. For example, the illustrated mode card 2712 includes nine data fields: a "begin date" field 2714 and a "begin time" field 2716, an "end date" field 2718 and an "end date" field 2720, a "location" field 2722, a "description" (or title) field 2724, and three command fields, to set a reminder 2726, mark an event as urgent 2728, or confirm existing information 2730.

The mode book 2710 is used as follows. If a user has been using his scanning pen 2410 to read business cards, for example, the system expects to receive data representative of a person's identity, office address, phone number, etc. However, if the user wishes to start inputting calendar information, there is no simple way to indicate that using simply the scanning pen. It is possible to use one or more input buttons to change the mode, but that method can be tedious and subject to error. Instead, using the mode book 2710, the user locates the mode card 2712 pertaining to the calendar genre, and runs the scanning pen over the selected field, such as "begin date" 2714. This indicates to the system that both a genre change and a mode change should occur. Subsequent swipes on the same calendar genre mode card 2712 will indicate only a mode change. Changing the mode before each document scanning swipe of the scanning pen 2410 can be made necessary to indicate the following information, or in a preferred embodiment, can override the system's defaults (as described with reference to FIGS. 7–11).

In a preferred embodiment of the scanning pen 2410, mode changes and genre changes are indicated and confirmed to the user by either audible or tactile feedback. For example, audible beep codes or the like (even synthesized voice prompts) can be used to indicate that (a) the calendar genre is presently active, and (b) the system expects to receive a "begin date" next. Similarly, unique tactile sensations, implemented either by vibrating the pen body (as in a pager with a silent alarm) or by causing the scanning head 2416 to move in a manner simulating a texture on the paper being scanned, can express similar information to the user. Accordingly, the user need not look at the display screen 2520 or 2620 to confirm each and every mode change.

Although the scanning pen 2410 and mode book 2710 have been described with reference to the calendaring system disclosed above and business cards, it should be noted that the system is adaptable to read other types of documents, as well, simply by augmenting the mode book 2710 to specify different genres and data types.

Parasitic User Terminal

Figure 28:
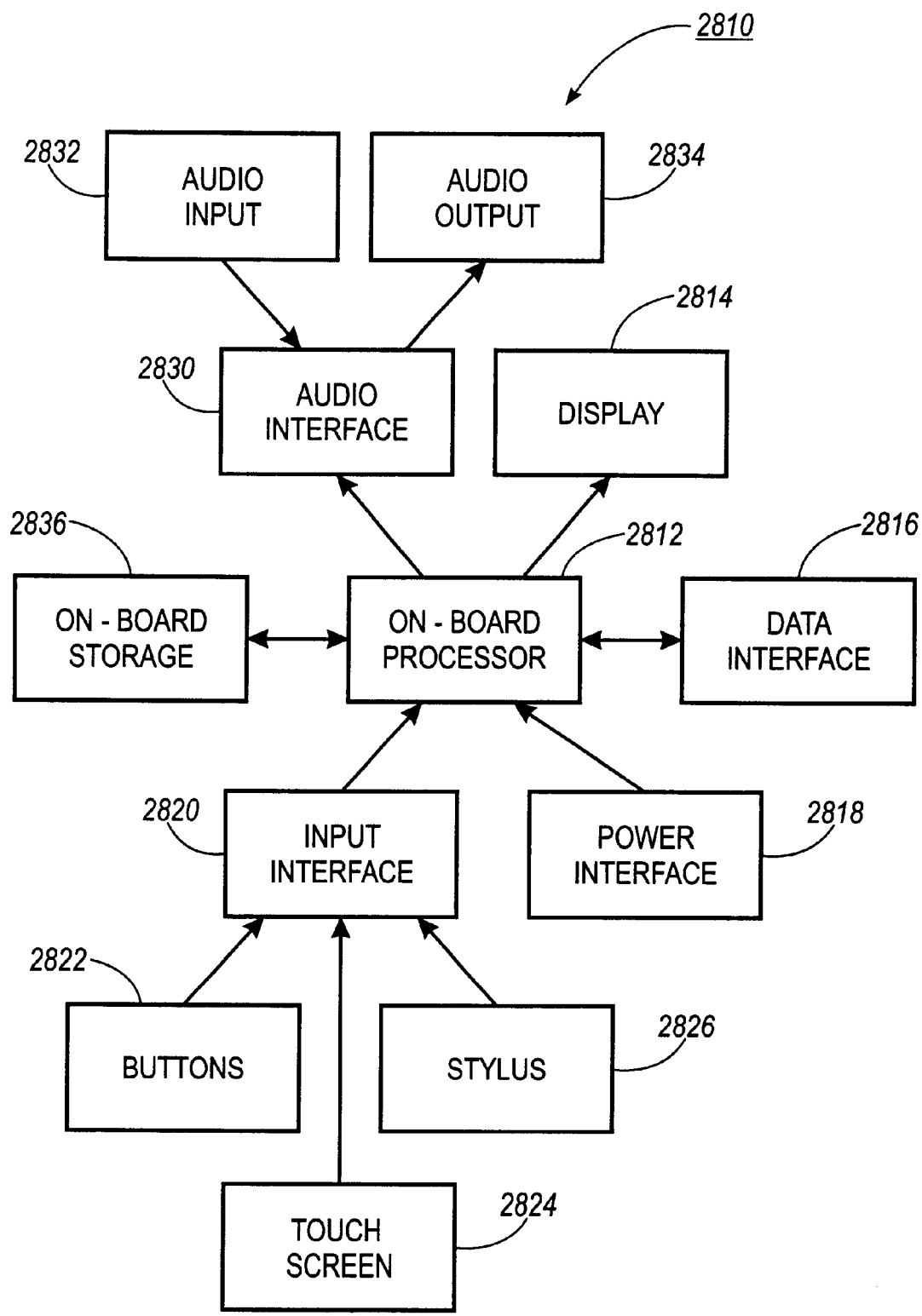
FIG. 28 is a functional block diagram illustrating the components of an exemplary parasitic user terminal according to the invention.

Another useful aspect of the present invention is a parasitic user terminal (as in the user terminals 110 and 112 of FIG. 1). An exemplary interactive parasitic user terminal 2810 is illustrated functionally in FIG. 28. The terminal 2810 includes at least an on-board processor 2812, an imaging display 2814, a data interface 2816, and a power interface. Other features of the system (see FIG. 2) which may be incorporated into the terminal 2810 include an input interface 2820 with buttons 2822, a touchscreen 2824, and a handwriting stylus 2826, and an audio interface 2830 with an audio input 2832 and an audio output 2834. There may also be on-board storage, facilitating the use of the terminal 2810 without a constant communications link to the rest of the system.

In a preferred embodiment, the terminal has a low profile, and is adapted to be mounted to a wall, host appliance (such as a refrigerator), or other vertical surface. It is recognized that the kitchen, and particularly the refrigerator, is a common household meeting place. This is evidenced by the common practice of posting shopping lists, notes, and other documents to the refrigerator (or a nearby bulletin board) with magnets or push pins. Accordingly, there are advantages realized in placing a user terminal at a location where an entire family is likely to see messages, notes, and calendars. However, it should be recognized that other components of the system are more advantageously located elsewhere.

Figure 29:
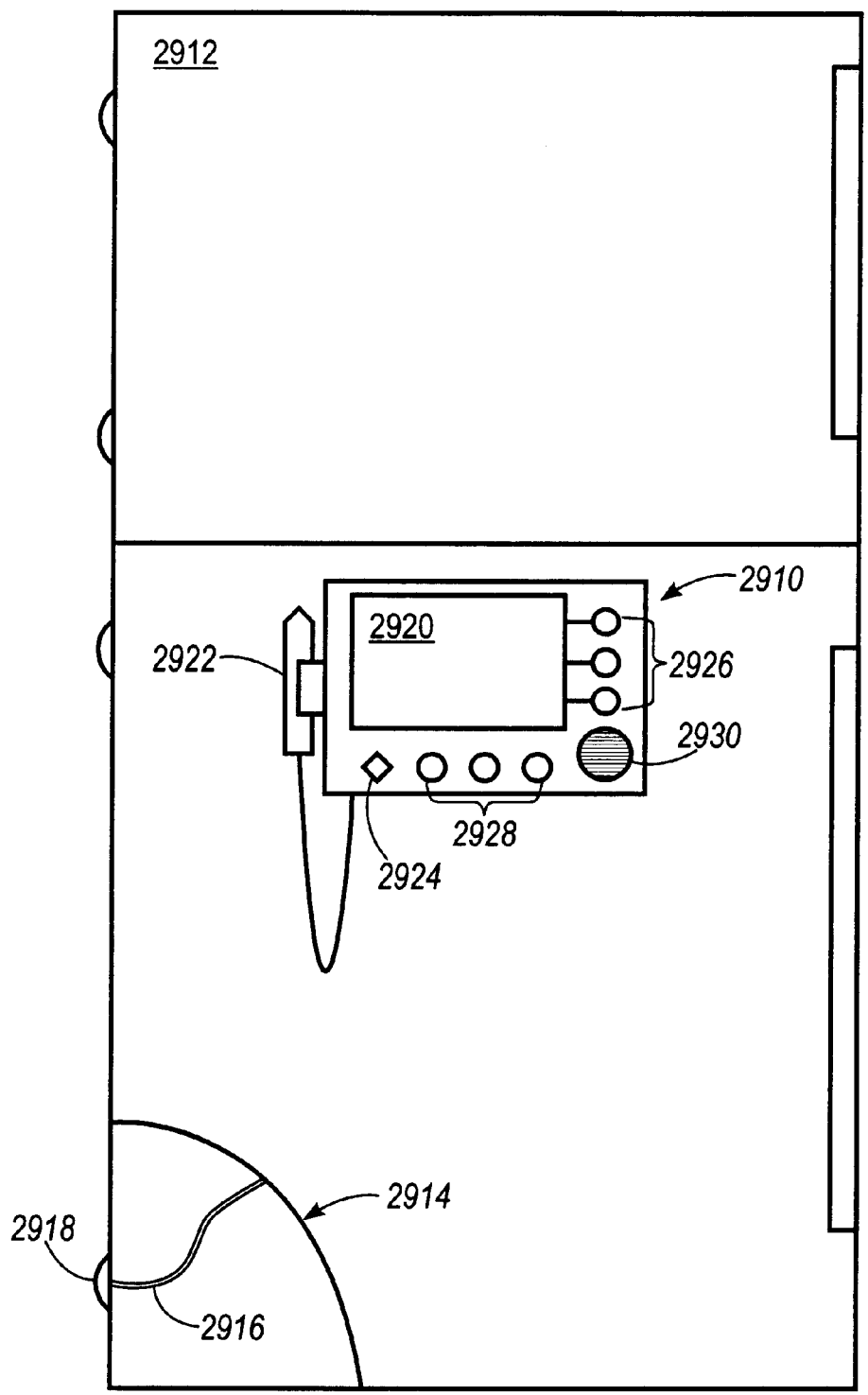
FIG. 29 is a visual representation of the parasitic user terminal of FIG. 28 mounted to a host refrigerator.

One embodiment of the user terminal is illustrated in FIG. 29. A parasitic display terminal 2910 is mounted in cooperation with (and in an alternative embodiment, is structurally integral with) a specially adapted refrigerator 2912. In particular, as shown by a cutaway portion 2914 of the refrigerator door, the refrigerator includes a power supply line 2916 running through the door, via a hinge, to the refrigerator's power source. This power supply line 2916 is coupled to the power interface 2818 of the terminal 2910 via a socket in the door of the refrigerator 2912, which may also provide structural support to the terminal 2910, or alternatively by an inductive coupler well known in the art. In either case, the terminal 2910 derives its power from the host refrigerator 2912.

It is important to note that, although the terminal 2910 is physically mounted to a host appliance, namely the refrigerator 2912, no data interface is made directly between the host 2912 and the terminal 2910. Accordingly, the terminal 2910 has no ability to display or otherwise indicate the status of its host, unless the host has the separate capability of transmitting its status to the remote CPU 212 (FIG. 2), which then passes information to the terminal 2910. The primary purpose of the terminal 2910 is to provide user interaction with the system of the invention.

Other features of the terminal 2910 are also apparent. A display screen 2920, a stylus 2922, a directional navigation pad 2924, selection buttons 2926, command entry buttons 2928, and an audio interface are also present; these features are optional to the terminal, and are well known in the art.

Figure 30:
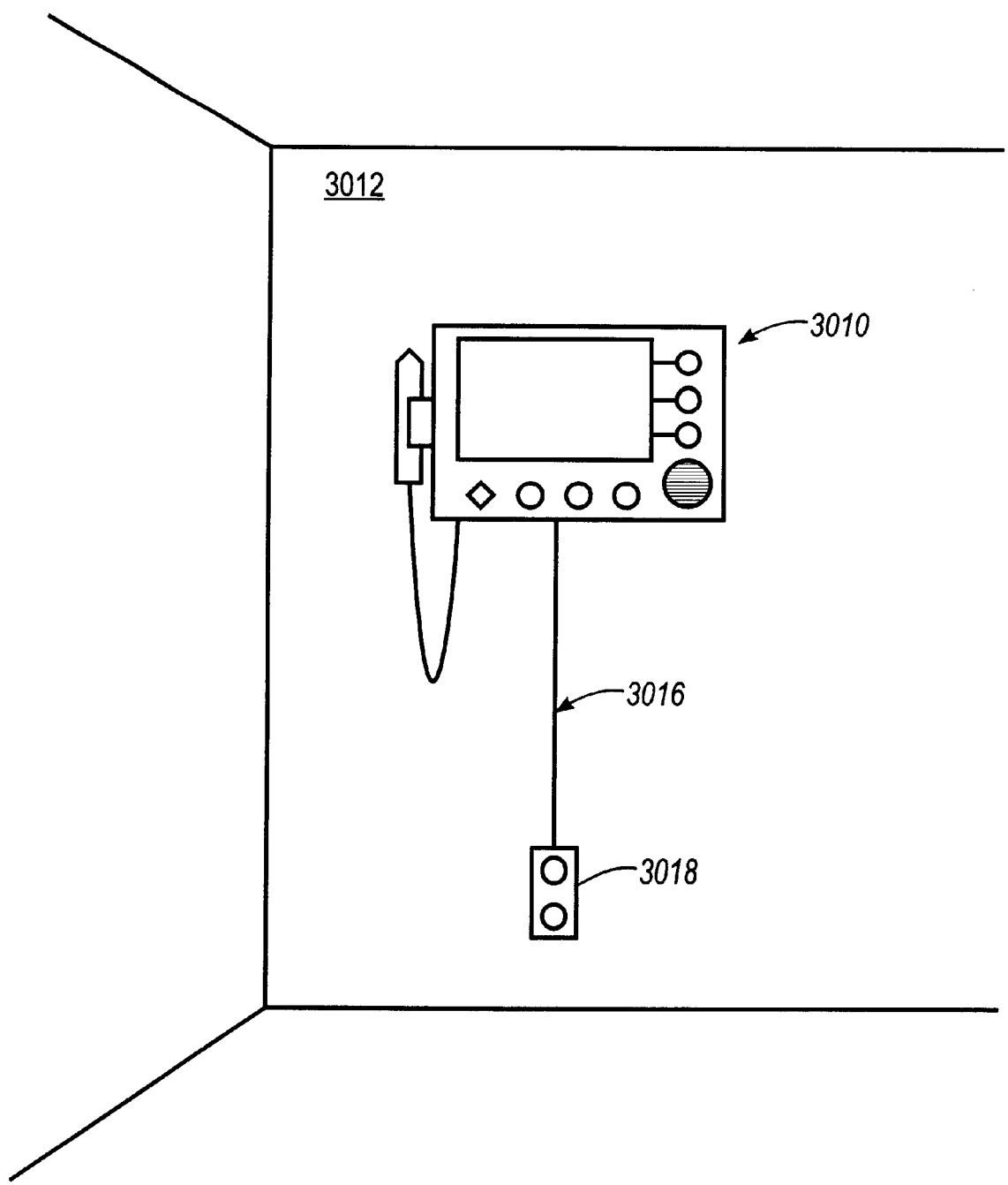
FIG. 30 is a visual representation of the parasitic user terminal of FIG. 28 mounted to a wall.

An alternative version of the terminal is shown in FIG. 30 as a wall-mounted terminal 3010. This terminal, while otherwise similar to the version illustrated in FIG. 29, is physically mounted to a wall 3012. A power supply line 3016 is coupled to a typical household power outlet 3018. Once again, power can be received by the terminal 3010 either via an outlet, which may also provide structural support, or inductive coupling.

While certain exemplary embodiments of the invention have been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations.

What is claimed is:

1. An interactive display device for physical attachment to a host structure, wherein the display device comprises:

an imaging display adapted to display a visual representation of at least one item of data;

a power interface adapted to receive power from the host structure and provide power for the interactive display device; and a data communication interface adapted to communicate bi-directionally with at least one remote device external to both the host structure and the display device;

wherein the display device is physically affixed to a substantially vertical surface of the host structure but is functionally separate from the host structure, and wherein there is no direct data interface between the host structure and the display device; and wherein the imaging display is adapted to display a visual representation of data received from the remote device, and wherein the remote device is adapted to process data received from the input apparatus.

2. The interactive display device of claim 1, further comprising at least one input device.

3. The interactive display device of claim 1, further comprising a processor adapted to control the imaging display.

4. The interactive display device of claim 3, wherein the processor is local to the display.

5. The interactive display device of claim 3, wherein the processor is remote from the display.

6. The interactive display device of claim 3, wherein the processor communicates with the display via the data communication interface.

7. The interactive display device of claim 1, wherein the display is structurally integral with the host structure.

8. The interactive display device of claim 1, wherein the host structure is an electrical device.

9. The interactive display device of claim 1, wherein the power interface is adapted to receive power from the electrical device.

10. The interactive display device of claim 9, wherein the power interface comprises an inductive coupling.

11. The interactive display device of claim 1, further comprising an output device interface.

12. The interactive display device of claim 11, further comprising a network coupled to the output device interface.

13. The interactive display device of claim 11, wherein the output device interface comprises a docking station for a portable computing device.

14. The interactive display device of claim 1, wherein the remote device comprises a central computer.

15. A system for presenting digitally stored information to at least one user, comprising:
- at least one display device physically and immovably affixed to a substantially vertical surface of the host structure but functionally separate from a host structure, wherein there is no direct data interface between the host structure and the display device, and wherein said display device comprises an imaging display adapted to display a visual representation of at least one item of data received from a remote device, a power interface adapted to receive power from the host structure and provide power for the interactive display device;
- a processor adapted to process data received from an input device;
- at least one input device;
- storage coupled to the processor;
- a data communication interface adapted to communicate bi-directionally with at least one remote input device external to both the host structure and the display for the transmittal of digitally stored information; and wherein the imaging display is adapted to display a visual representation of data received from the remote device, and wherein the remote device is adapted to process data received from the input apparatus.

16. The system of claim 15, wherein the data communication interface comprises a wireless link.

17. The system of claim 16, wherein the wireless link comprises an optical link.

18. The system of claim 16, wherein the wireless link comprises a radio-frequency (RF) link.

19. The system of claim 15, wherein the input device comprises a scanner adapted to read and process printed material.

20. The system of claim 15, wherein the input device comprises a gestural digitizer.

21. The system of claim 15, wherein the input device comprises a keyboard.

22. The system of claim 15, wherein the input device comprises a computer terminal.

23. The system of claim 15, wherein the input device is responsive to audio input.

24. The system of claim 23, wherein the input device comprises a voice recognition system.

25. The system of claim 15, wherein the input device comprises a touch-sensitive panel.

26. A system, for use in cooperation with a host structure and adapted to present digitally stored information to at least one user, the system comprising:
- at least one display device physically and immovably affixed to a substantially vertical surface of the host structure but functionally separate from the host structure, wherein the display device includes a data communication interface;
- a plurality of input devices, wherein each input device includes a data communication interface; and
- a centralized processor including a data communication interface;
- wherein the imaging display is physically integral with but functionally separate from the host structure, and wherein there is no direct data interface between the host structure and the imaging display.

* * * * *